United States Patent
Ranjan et al.

(10) Patent No.: US 12,437,252 B2
(45) Date of Patent: Oct. 7, 2025

(54) METHOD, SYSTEM AND COMPUTER PROGRAM PRODUCT FOR CUSTOMIZABLE PRESENTATION OF WORKFLOW TRANSITION

(71) Applicant: RAKUTEN SYMPHONY, INC., Tokyo (JP)

(72) Inventors: Tapas Ranjan, Tokyo (JP); Pratik Parikh, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/906,262

(22) PCT Filed: Jul. 27, 2022

(86) PCT No.: PCT/US2022/038446
§ 371 (c)(1),
(2) Date: Sep. 14, 2022

(87) PCT Pub. No.: WO2024/025522
PCT Pub. Date: Feb. 1, 2024

(65) Prior Publication Data
US 2025/0005482 A1  Jan. 2, 2025

(51) Int. Cl.
*G06Q 10/0633* (2023.01)
*G06F 3/0482* (2013.01)
*G06F 3/0484* (2022.01)

(52) U.S. Cl.
CPC ....... *G06Q 10/0633* (2013.01); *G06F 3/0482* (2013.01); *G06F 3/0484* (2013.01)

(58) Field of Classification Search
None
See application file for complete search history.

(56) References Cited

U.S. PATENT DOCUMENTS 6,484,158 B1 * 11/2002 Johnson ................. G06Q 30/02
707/999.1
7,363,594 B1 * 4/2008 Wright .................. G06Q 10/06
715/969

(Continued)

FOREIGN PATENT DOCUMENTS

| EP | 2958061 A1 * | 12/2015 | ............ G06F 8/20 |
| WO | WO-2008137998 A1 * | 11/2008 | ............ G06Q 10/06 |
| WO | WO-2009036079 A2 * | 3/2009 | ......... G06Q 10/0633 |

OTHER PUBLICATIONS

Chuanren et al "Proactive Workflow Modeling by Stochastic Processes with Application to Healthcare Operation and Management", research-article, pp. 1503-1602 (Year: 2014).*

(Continued)

*Primary Examiner* — Romain Jeanty
(74) *Attorney, Agent, or Firm* — HAUPTMAN HAM, LLP

(57) ABSTRACT

A system includes a processor, and a storage medium storing executable instructions. The executable instructions, when executed, cause the processor to visually present a first input area for receiving user input of a workflow transition setting for a workflow. The workflow includes a plurality of elements arranged in a sequence. Based on the workflow transition setting, the processor is caused to visually present a workflow transition input area for receiving user input of a transition, among the plurality of elements of the workflow, from a current element to a subsequent element in the sequence. In response to the workflow transition setting having a first value, the workflow transition input area is visually presented in a first format. In response to the workflow transition setting having a second value different from the first value, the workflow transition input area is visually presented in a second format distinctive from the first format.

20 Claims, 17 Drawing Sheets

(56) References Cited

U.S. PATENT DOCUMENTS

| | | | |
|---|---|---|---|
| 8,762,186 B2* | 6/2014 | Freire | G06Q 10/0633 |
| | | | 705/7.11 |
| 2002/0046072 A1* | 4/2002 | Arai | G06Q 10/0633 |
| | | | 702/182 |
| 2003/0172000 A1* | 9/2003 | Foster | G06Q 10/0875 |
| | | | 705/38 |
| 2006/0277089 A1* | 12/2006 | Hubbard | G06Q 10/06311 |
| | | | 705/7.26 |
| 2009/0044185 A1* | 2/2009 | Krivopaltsev | H04L 41/20 |
| | | | 717/173 |
| 2010/0106547 A1* | 4/2010 | Adi | G06F 8/38 |
| | | | 705/7.27 |
| 2012/0095801 A1 | 4/2012 | Freire et al. | |
| 2014/0180703 A1* | 6/2014 | Mansker | G16H 30/00 |
| | | | 705/2 |
| 2015/0370540 A1* | 12/2015 | Coslovi | G06Q 10/0633 |
| | | | 717/121 |
| 2018/0130003 A1 | 5/2018 | Sublett et al. | |
| 2020/0234242 A1* | 7/2020 | Parks | G06F 8/34 |

OTHER PUBLICATIONS

Marcel et al "Visual Management of Workflows in Web Development Frameworks", Dec. 2011, IEEE, pp. 7-10 (Year: 2011).*

* cited by examiner

| ☰ Ticket Center | | | | Ticket Center ⌄ | | Create Ticket ⌄ ⋮ 🔍 |
|---|---|---|---|---|---|---|
| Quick Filter : All Tickets | | | | 🔍 Search | | |
| | | | | | | ⊞ ▭ ▯ ⌵ ▽ ▯ ≡ |
| ☐ | Status ✱ | Ticket Family ✱ | Ticket ID ✱ | Ticket Title ✱ | Aging ✱ | Resolved by Workgroup ✱ Ticket Description |
| ☐ | ◐ Open | RTT - Trouble Ticket | RTT-2022-06-21-001671 | Ticket Title 1 | 01 Hour(s) 49 Minute(s) | - - |
| ☐ | ○ Open | RTT - Trouble Ticket | Ticket ID 2 | Ticket Title 2 | 01 Month(s) 08 Day(s) 16 Hour(s) 23 M | - - |
| ☐ | ○ New | RTT - Trouble Ticket | Ticket ID 3 | Ticket Title 3 | 00 Minute(s) | - - |
| ☐ | ◐ Open | RTT - Trouble Ticket | Ticket ID 4 | Ticket Title 4 | 13 Day(s) 22 Hour(s) 16 Minute(s) | - - |
| ☐ | ○ New | RTT - Trouble Ticket | Ticket ID 5 | Ticket Title 5 | 01 Minute(s) | - - |
| ☐ | ○ Open | RTT - Trouble Ticket | Ticket ID 6 | Ticket Title 6 | 12 Day(s) 21 Hour(s) 43 Minute(s) | Work Group 1 - |
| ☐ | ○ New | Ticket family | Ticket ID 7 | Ticket Title 7 | 03 Day(s) 15 Hour(s) 12 Minute(s) | - - |
| ☐ | ○ Open | RTT - Trouble Ticket | Ticket ID 8 | Ticket Title 8 | 10 Day(s) 15 Hour(s) 12 Minute(s) | - - |
| ☐ | ○ Open | RTT - Trouble Ticket | Ticket ID 9 | Ticket Title 9 | 17 Hour(s) 41 Minute(s) | - - |
| ☐ | ○ New | RTT - Trouble Ticket | Ticket ID 10 | Ticket Title 10 | 03 Hour(s) 07 Minute(s) | - - |
| ☐ | ● Resolve | RTT - Trouble Ticket | Ticket ID 11 | Ticket Title 11 | 01 Hour(s) 07 Minute(s) | Work Group 2 - |

FIG. 2A

Edit Workflow Details — 230

Name of the Workflow * — 231
Workflow Name  26/100

Description *
Workflow Description  26/500

Mandatory Information

Type of Ticket * — 232
Ticket ▼

Ticket Family * — 233
Ticket Family ▼

Set As Action Button ☐ — 235

Additional Information — 263

Domain
Select Domain ▼

Subdomain
Select Subdomain ▼

Category
Select Category ▼

SubCategory
Select SubCategory ▼

Naming Rule
Select Naming Rule ▼

Impact
Select Impact ▼

Urgency
Select Urgency ▼

Priority
Select Priority ▼

Cancel — 264

⬈ Navigate to WF builder — 265

Update — 266

Net Status Category     X

Workflow Status Name *  — 270
[ Open ]

Description *  — 272     4/50
[ All statuses Falling Under Open Category ]

40/500

👁 Active — 273

275     276
[Cancel] [Create]

FIG. 2H

Net Workflow Status     X

Workflow Status Name * — 280     Workflow Status Category Name *
[ In Review ]     [ Open ▼ ]

Description *   9/50    282   281
[ In review status for a problem ticket falls implies that the ticket is still being operated upon and has not been resolved ]

122/500

Color
[☐▼]   👁 Active — 283

284

285     286
[Cancel] [Create]

FIG. 2J

METHOD, SYSTEM AND COMPUTER PROGRAM PRODUCT FOR CUSTOMIZABLE PRESENTATION OF WORKFLOW TRANSITION

RELATED APPLICATIONS

The present application is a National Phase of International Application No. PCT/US2022/038446, filed Jul. 27, 2022.

TECHNICAL FIELD

The present disclosure is related to workflows and visual presentation of workflows in user interfaces (UIs).

BACKGROUND

Many industries, services, applications, businesses, etc. have procedures that are complex and prone to error due to various internal guidelines and/or external mandates. Workflows, or workflow diagrams, are developed to present such complex procedures in a manner that is easier for humans to follow the procedures, while reducing potential errors such as steps being omitted, or performed incorrectly or out of order, etc.

SUMMARY

In some embodiments, a system for customizable presentation of workflow transition comprises at least one processor, and at least one computer readable storage medium coupled to the at least one processor and configured to store executable instructions. The executable instructions, when executed by the at least one processor, cause the at least one processor to visually present a first input area for receiving user input of a workflow transition setting for a workflow, wherein the workflow comprises a plurality of elements arranged in a sequence, and, based on the workflow transition setting, visually present a workflow transition input area for receiving user input of a transition, among the plurality of elements of the workflow, from a current element to a subsequent element in the sequence. The executable instructions, when executed by the at least one processor, cause the at least one processor to, in response to the workflow transition setting having a first value, visually present the workflow transition input area in a first format, and, in response to the workflow transition setting having a second value different from the first value, visually present the workflow transition input area in a second format distinctive from the first format.

In some embodiments, a method of customizable presentation of workflow transition is performed at least in part by at least one processor. The method comprises providing a unique process identification (ID) for each instance of a workflow, storing a workflow transition setting of the workflow in a database, storing the process ID in association with a ticket family to which a ticket corresponding to the instance of the workflow belongs, executing a query on service logic to store workflow data of the workflow in the database, and, in response to different values of the workflow transition setting, visually presenting, correspondingly in different formats, a workflow transition input area for receiving user input of a transition, among a plurality of elements arranged in a sequence in the workflow, from a current element to a subsequent element in the sequence.

In some embodiments, a computer program product comprises a non-transitory, tangible computer readable storage medium storing a computer program that, when executed by at least one processor, causes the at least one processor to receive at least one user-customized workflow status for a workflow, receive a workflow transition setting for the workflow, and, based on the workflow transition setting and using the at least one user-customized workflow status, visually present one or more subsequent elements following a current element among a plurality of elements arranged in a sequence in the workflow. In response to a first value of the workflow transition setting, the at least one processor is caused to visually present the one or more subsequent elements as corresponding one or more selectable menu items in a drop-down menu. In response to a second value of the workflow transition setting, the at least one processor is caused to visually present the one or more subsequent elements as corresponding one or more operable action buttons.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features be arbitrarily increased or reduced for clarity of discussion.

DETAILED DESCRIPTION

Figure 1A:
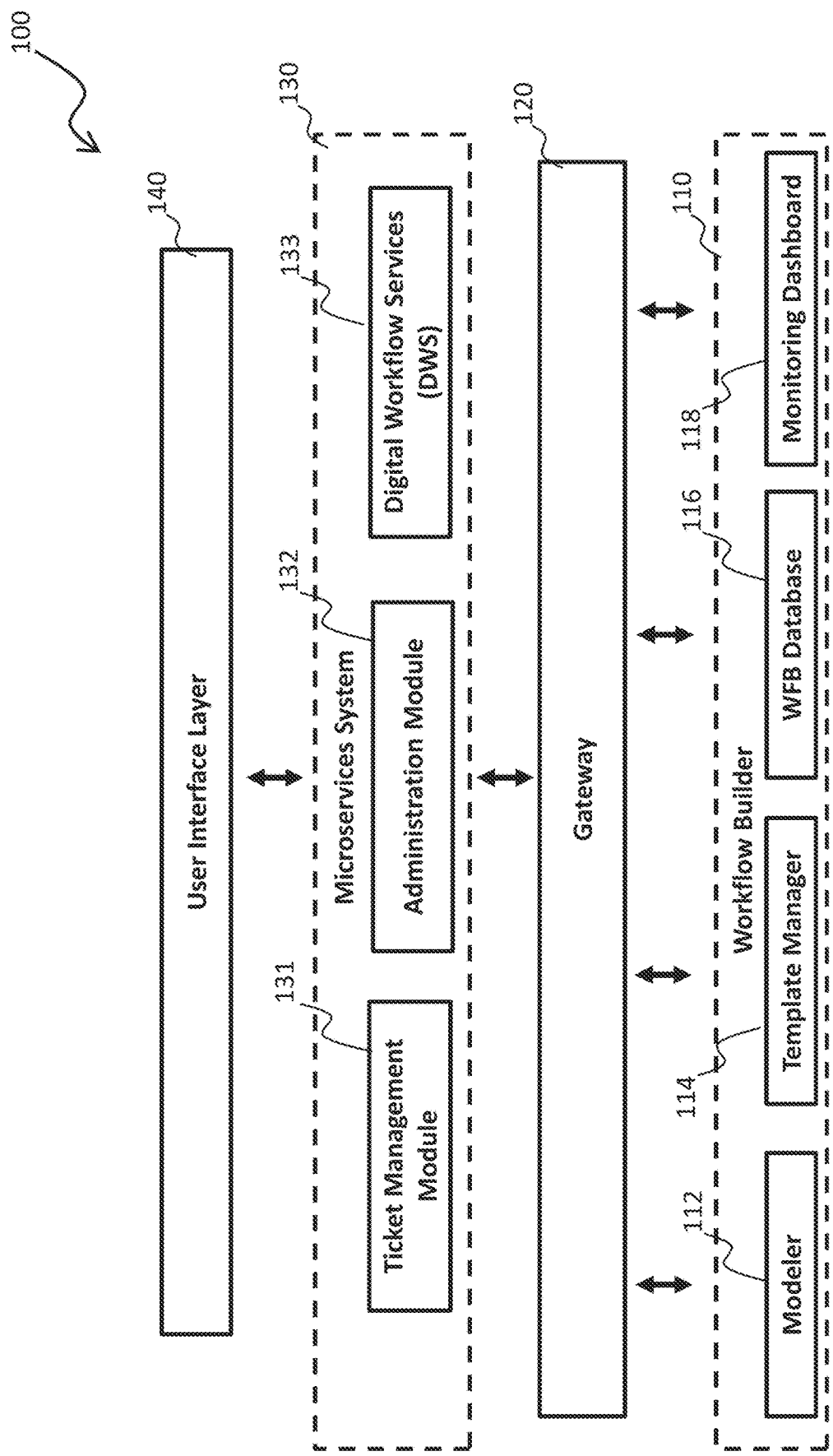
FIG. 1A is a schematic diagram of a system for customizable presentation of workflow transition, in accordance with some embodiments.

The following disclosure includes many different embodiments, or examples, for implementing different features of the subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeats reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, be usable herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors usable herein likewise be interpreted accordingly.

A workflow or workflow diagram is a description, in a step-by-step manner, of a process for how work is to be done. Examples of processes include, but are not limited to, procedures, customer support/service, business and/or technical plans, or the like. A workflow when assigned to one or more end-users (also referred to herein as "assignees") for execution by the one or more end-users and/or for guiding the one or more end-users in executing a procedure or business/technical plan is referred to as a ticket. In some embodiments, a ticket is an instance of a workflow. For simplicity, ticket and workflow are used interchangeably in some embodiments. In some situations, an end-user moves a ticket or workflow through various statuses by selecting a desired status from a number of statuses presented to the end-user while the workflow is being executed (or during the ticket journey). Various factors may affect the end-user's accuracy in this process. Examples factors include, but are not limited to, the end-user's skill level and/or experience, complexity and/or number of statuses in the workflow, or the like. In at least one embodiment, intuitive, easy-to-understand presentations of workflows and/or their statuses and/or transitions among elements/statuses within a workflow (referred to herein as "workflow transition") are considerations for configuring an effective ticket management system.

In some embodiments, for workflow transition in a workflow, one or more statuses selectable by an end-user are visually presented to the end-user in different formats, depending on a workflow transition setting included in or associated with the workflow. For example, when the workflow transition setting has a first value, e.g., True (or False), the one or more selectable statuses are visually presented to the end-user in the form of one or more corresponding action buttons, whereas when the workflow transition setting has a second value, e.g., False (or True), the one or more selectable statuses are visually presented to the end-user in the form of menu items in a menu, such as a a drop-down menu. In some embodiments, one or more of the selectable statuses are customizable, which are reflected in customizable names of the corresponding action buttons or menu items. As a result, in at least one embodiment, it is possible to achieve one or more advantages including, but not limited to, flexibility in how workflow transition options are presented to end-users for ticket lifecycle management, reduced time to resolve a ticket, reduced number of mismanagement cases due to human error, or the like. Further features and/or advantages are within the scopes of various embodiments.

FIG. 1A is a schematic diagram of a system 100 for customizable presentation of workflow transition, in accordance with some embodiments.

The system 100 comprises a workflow builder 110, a gateway 120, a microservices system 130, and a user interface (UI) layer 140. The workflow builder 110 comprises a modeler 112, a template manager 114, a workflow builder (WFB) database 116, and a monitoring dashboard 118. The microservices system 130 comprises a ticket management module 131, an administration module 132, and a digital workflow services (DWS) module 133. In some embodiments, each component of the system 100, i.e., the workflow builder 110, gateway 120, microservices system 130, and mobile terminal 140, and/or the corresponding sub-components, e.g., modeler 112, template manager 114, WFB database 116, event dispatcher 118, ticket management module 131, administration module 132, and DWS module 133, comprises hardware on/by which software corresponding to various algorithms and/or operations described here is executed. An example hardware configuration for any one or more of the components of the system 100 includes a computer system described with respect to FIG. 5. For example, each of the components of the system 100 and/or their corresponding modules includes executable instructions stored in at least one memory and executed by at least one processor. In some embodiments, one or more of the components, and/or sub-components thereof, in the system 100 are implemented on/by a cloud platform. Other configurations are within the scopes of various embodiments.

The workflow builder 110 is configured to generate, store, manage workflows usable by various systems and/or components, including the microservices system 130. In the workflow builder 110, the modeler 112 is configured to provide an environment, e.g., a graphing environment, for users to build workflows, and to save workflow configurations of the built workflows as Extensible Markup Language (XML) documents to be executed by a workflow engine at runtime. In some embodiments, the workflow are compliant with the Business Project Management Notation (BPMN) specification. Other workflow configurations and/or specifications and/or programing language or codes are within the scopes of various embodiments. The template manager 114 contains prestored workflows which can be used as templates based on which new workflows may be quickly built. The WFB database 116 stores workflow configurations created by or loaded into the workflow builder 110. In some embodiments, the WFB database 116 further stores workflow data generated during, and/or as a result of, execution of one or more workflows by a workflow engine. In at least one embodiment, the WFB database 116 further stores date, codes or other information required for operations of the other sub-components of the workflow builder 110. The monitoring dashboard 118 is configured to monitor and/or manage operations and/or executions of workflows. The described configuration of the workflow builder 110 with respect to FIG. 1A is an example. Other workflow builder configurations are within the scopes of various embodiments.

The gateway 120 is configured to provide communications and/or data exchanges between the workflow builder 110 and the gateway 120. In some embodiments, the gateway 120 is part of a network through which the workflow builder 110 is connected to the microservices system 130.

The microservices system 130 is configured to create and/or manage tickets in the system 100. The microservices system 130 is further configured to provide customizable presentation of workflow transition in accordance with some embodiments. In the microservices system 130, the DWS module 133 is configured as an interface between the workflow builder 110 and the administration module 132, so as to provide various features or functions of the workflow builder 110 to the administration module 132. For example, as described herein in at least one embodiment, it is possible to create a new workflow in the administration module 132 by interfacing with the workflow builder 110 through the DWS module 133. The administration module 132 is configured to perform one or more of permitting users to create new workflows by using the DWS module 133 and workflow builder 110, storing workflow transition settings for customizable presentation of workflow transition for various workflows, permitting users to customize statuses and/or status categories, or executing workflows. The ticket management module 131 is configured to manage tickets and, based on data provided from the administration module 132, output data to the UI layer 140 to be presented on a UI to a user who may be an end-user assigned to handle a ticket/workflow, or an administrator who creates or modifies a workflow. In some embodiments, the ticket management module 131 and DWS module 133 communicate with the administration module 132 by API application programming interface (API) calls. The described configuration of the microservices system 130 with respect to FIG. 1A is an example. Other microservices system configurations are within the scopes of various embodiments.

The UI layer 140 is configured to present data output from the microservices system 130, e.g., the ticket management module 131, on a UI for a user. In some embodiments, the UI layer 140 is configured to generate a graphic user interface (GUI) for a user. The GUI generated by the UI layer 140 is visually presented to the user to help the user to move a workflow through various statuses, and/or create or manage various settings and/or customized statuses as described herein. In some embodiments, a user who creates, manages, assigns, customizes workflows/tickets and/or settings related to workflows/tickets is referred to as an administrator. A user who executes a workflow and moves the workflow through various statuses may be an administrator, or an end-user.

In some embodiments, an example of visual presentation of a workflow and/or screens of a UI includes displaying the workflow and/or UI screens on a display, such as a monitor or a touch screen. The display may be a display of a computer system implementing one or more components of the system 100, or a remote display coupled to one or more components of the system 100 through a network or communication link. Other ways for visually presenting information, such as projection on a screen, three-dimensional (3D) projection, using glasses and/or other head-mounted devices, or any other manners for presenting information to be visually perceptible by a user, are within the scopes of various embodiments. For simplicity, "displaying" or "displayed" may be used in the following description as an example manner for visual presentation of information. Other manners for visual presentation, as discussed herein, are not excluded. A user may interact with displayed, or otherwise visually presented, information by a pointing device (e.g., a mouse), a touch screen, contact-less gestures, voice commands, or the like.

Figure 1B:
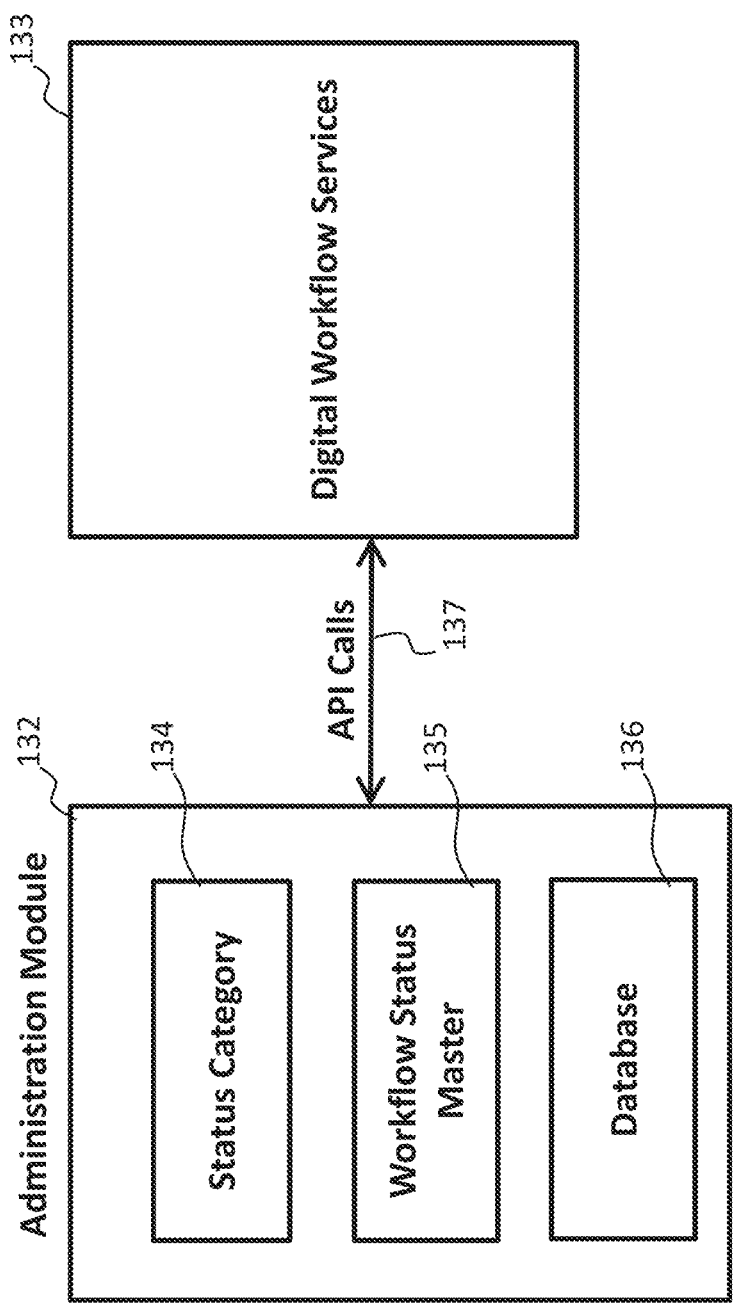
FIG. 1B is a schematic diagram with further details of a portion of the system of FIG. 1A, in accordance with some embodiments.

FIG. 1B is a schematic diagram with further details of a portion of the system 100 of FIG. 1A, in accordance with some embodiments.

In the example configuration in FIG. 1B, the administration module 132 comprises a status category module 134, a workflow status master module 135, and a database (DB) 136. Each of the status category module 134, workflow status master module 135, database 136 comprises hardware on/by which software corresponding to various algorithms and/or operations described here is executed. An example hardware configuration includes a computer system described with respect to FIG. 5. FIG. 1B further illustrates that the DWS module 133 is communicated with the administration module 132 by API calls 137.

The status category module 134 is configured to permit a user, e.g., an administrator, to create or manage customized workflow status categories. An example operation of the status category module 134 is described with respect to FIG. 2G.

The workflow status master module 135 is configured to permit a user, e.g., an administrator, to create or manage customized workflow statuses under one or more workflow status categories. An example operation of the workflow status master module 135 is described with respect to FIG. 2H.

The database 136 stores data and/or settings related to a workflow or ticket. For example, the database 136 stores a workflow transition setting based on which options for workflow transition are visually presented to a user in different formats. The database 136 further stores a process ID unique for each instance of a workflow and workflow data, as described with respect to FIG. 3. In an example, the database 136 and/or the WFB database 116 is/are implemented by one or more non-transitory computer-readable media in one or more computer systems, as described with respect to FIG. 5. Other database configurations are within the scopes of various embodiments.

In some embodiments, workflows are generated by software, such as Camunda. In at least one embodiment, one or more modules described herein comprise code and/or scripts in, e.g., Java, Javascript Object Notation (JSON) in a platform such as Angular, or the like. Other programming language, code, software, platforms are within the scopes of various embodiments.

Figure 1C:
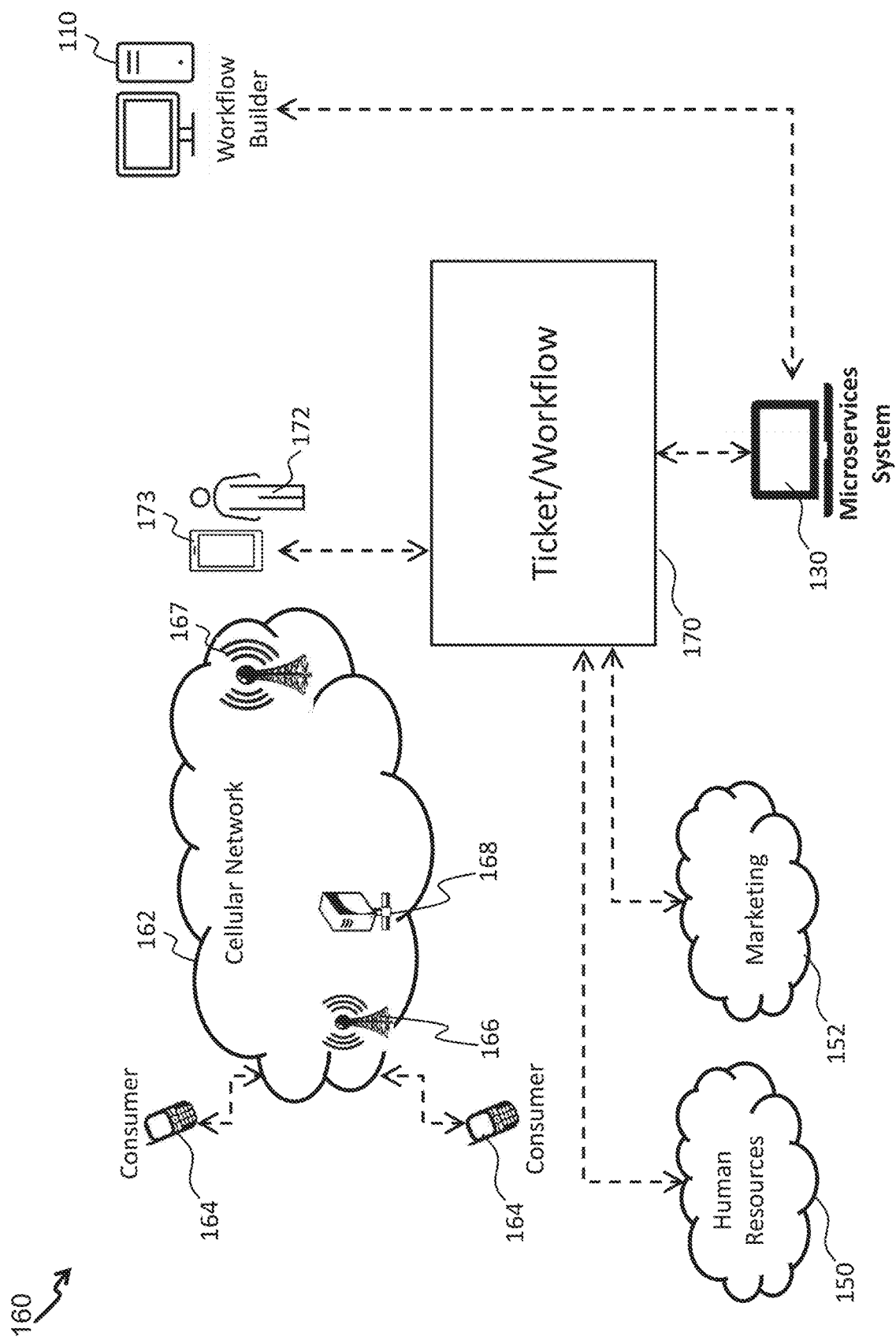
FIG. 1C is a schematic diagram of an example communications system in which customizable presentation of workflow transition in accordance with one or more embodiments is applicable.

FIG. 1C is a schematic diagram of an example communications system 160 in which customizable presentation of workflow transition in accordance with one or more embodiments is applicable.

The communications system 160 in FIG. 1C is just an example of an industry, technical field, service or application where the customizable presentation of workflow transition in accordance with one or more embodiments is applicable. Various other industries, technical fields, services or applications are within the scopes of various embodiments. For example, as also illustrated in FIG. 1C, customizable presentation of workflow transition in accordance with one or more embodiments is applicable to fields or applications such as human resources 150, marketing 152. These fields of human resources and marketing are, again, just examples, and other industries, technical fields, services or applications are within the scopes of further embodiments.

In the example configuration of the communications system 160 in FIG. 1C, consumers' mobile terminals 164 are coupled to a cellular network 162 to receive communication services. In an example, the cellular network 162 comprises a plurality of cells (not shown) in which cellular services are provided, through corresponding base stations. Representative base stations 166, 167 are illustrated in FIG. 1C. The base stations constitute a radio access network, and are coupled to a core network of the cellular network 162. A representative network device 168 of the core network is illustrated in FIG. 1C. Examples of the cellular network 162 include, but are not limited to, a long term evolution (LTE) network, a fifth generation (5G) network, a non-standalone (NSA) network, a standalone (SA) network, a global system for mobile communications (GSM) network, a general packet radio service (GPRS) network, a code-division multiple access (CDMA) network, a Mobitex network, an enhanced GPRS (EDGE) cellular network, or the like.

Example configurations of the base stations include cell towers each having one or more cellular antennas, one or more sets of transmitter/receivers transceivers, digital signal processors, control electronics, a Global Positioning System (GPS) receiver for timing (e.g., for CDMA2000/IS-95 or GSM systems), primary and backup electrical power sources, and sheltering. Examples of mobile terminals 164, include, but are not limited to, cell phones, tablets, media players, gaming consoles, personal data assistants (PDAs), laptops, and other electronic devices configured to transmit and/or receive cellular communication to/from the base stations of the cellular network 162. An example hardware configuration of a mobile terminal and/or a base station includes a computer system described with respect to FIG. 5, with the addition of one or more cellular antennas and corresponding cellular transceiving circuitry. Examples of communication technologies for performing cellular communications between base stations and mobile terminals include, but are not limited to, 2G, 3G, 4G, 5G, GSM, EDGE, WCDMA, HSPA, CDMA, LTE, DECT and WiMAX. Examples of services provided over cellular communication, herein referred to as cellular communication services, include, but are not limited to, voice calls, data, emails, messages such as SMS and MMS, applications, and control signals. Example components (or network devices 168) of the core network include, but are not limited to, serving gateways (SGW), high rate packet data serving gateway (HSGW), packet data network gateway (PGW), packet data serving node (PDSN), mobility management entity (MME), home subscriber server (HSS), and policy control rules function (PCRF). The components of the core network are coupled with each other and with the base stations by one or more public and/or proprietary networks. An example hardware configuration of a component or network device 168 of the core network includes a computer system described with respect to FIG. 5.

The microservices system 130 is configured to create, manage and/or visually present various tickets in the communications system 160. In some embodiments as described herein, the microservices system 130 creates and/or manages workflows in conjunction with the workflow builder 110, with the DWS module 133 acting as an interface between the workflow builder 110 and the microservices system 130. An example ticket 170 is illustrated in FIG. 1C. The microservices system 130 creates the ticket 170 and assigns to an end-user 172, e.g., a field engineer or technician, to handle. The end-user 172 uses his/her mobile equipment 173 to display the workflow corresponding to the ticket 170 and/or to move the workflow through various statuses as described herein. In some embodiments, besides moving the workflow through various statuses, the end-user 172 performs one or tasks required by the workflow or ticket 170. For example, the end-user 172 collects data and/or measurements regarding to one or more operations, functions, components, etc., of the cellular network 162. In the example configuration in FIG. 1C, the end-user 172 performs tasks, such as surveying, installing, servicing or checking operations of the base station 167, in accordance with requirements, tasks or steps defined in the ticket 170. The end-user 172 performs tasks required by the ticket 170, he/she moves the workflow from one status with completed tasks toa next status with further tasks to be performed, until the ticket 170 is completed (or otherwise terminated, e.g., cancelled). Examples of workflow transition, i.e., how a workflow is moved through statuses, are described with respect to FIGS. 2E and 2I-2N. Workflow transitions are performed in similar manners in other industries or fields, such as human resources 150 or marketing 152, although specific tasks to be performed by end-users in these fields would be different from those described for the end-user 172 in the communications system 160.

Figure 2B:
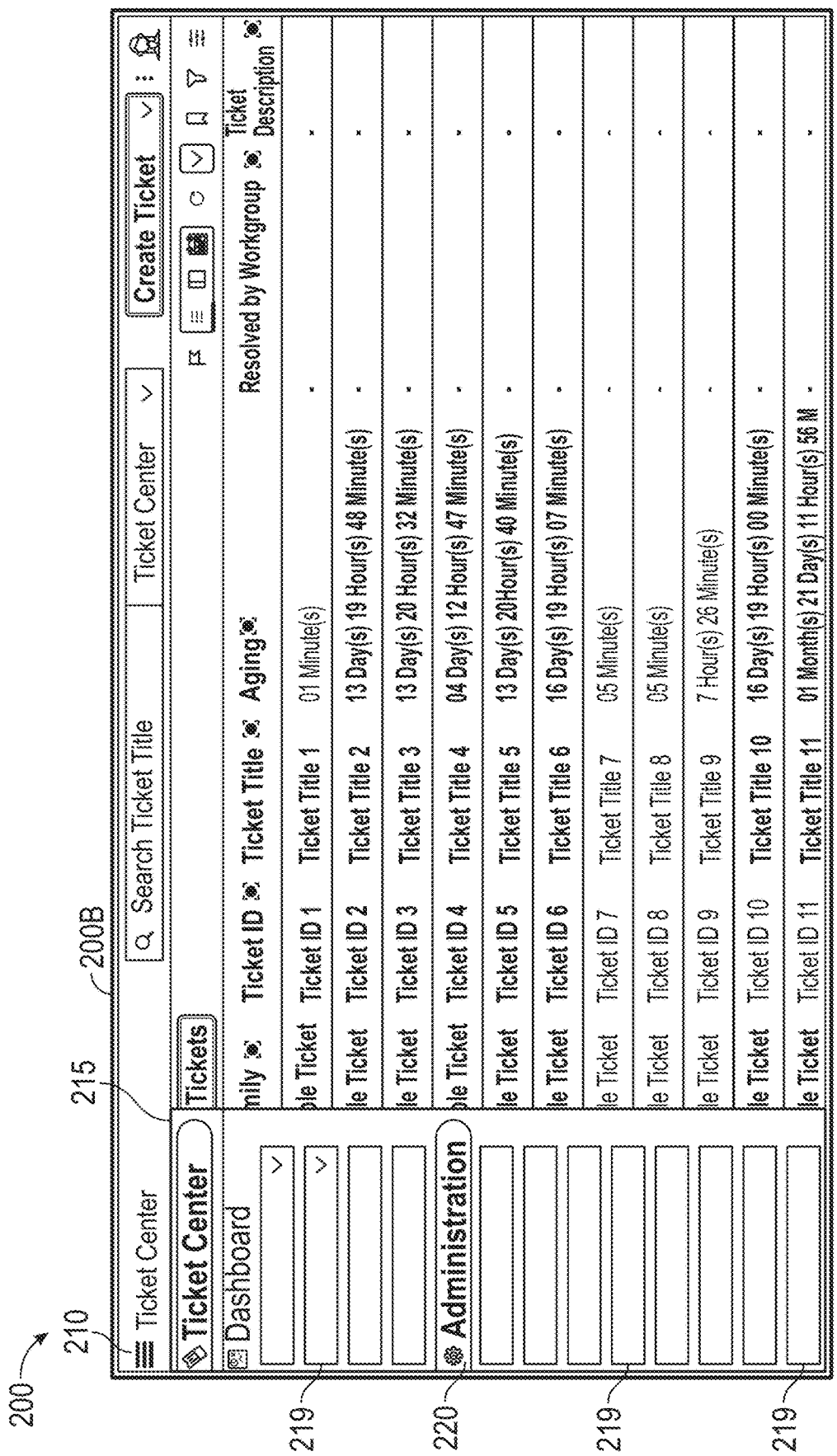
FIGS. 2A-2N are schematic diagrams showing various screens of a user interface with customizable presentation of workflow transition, in accordance with some embodiments.
Figure 2C:
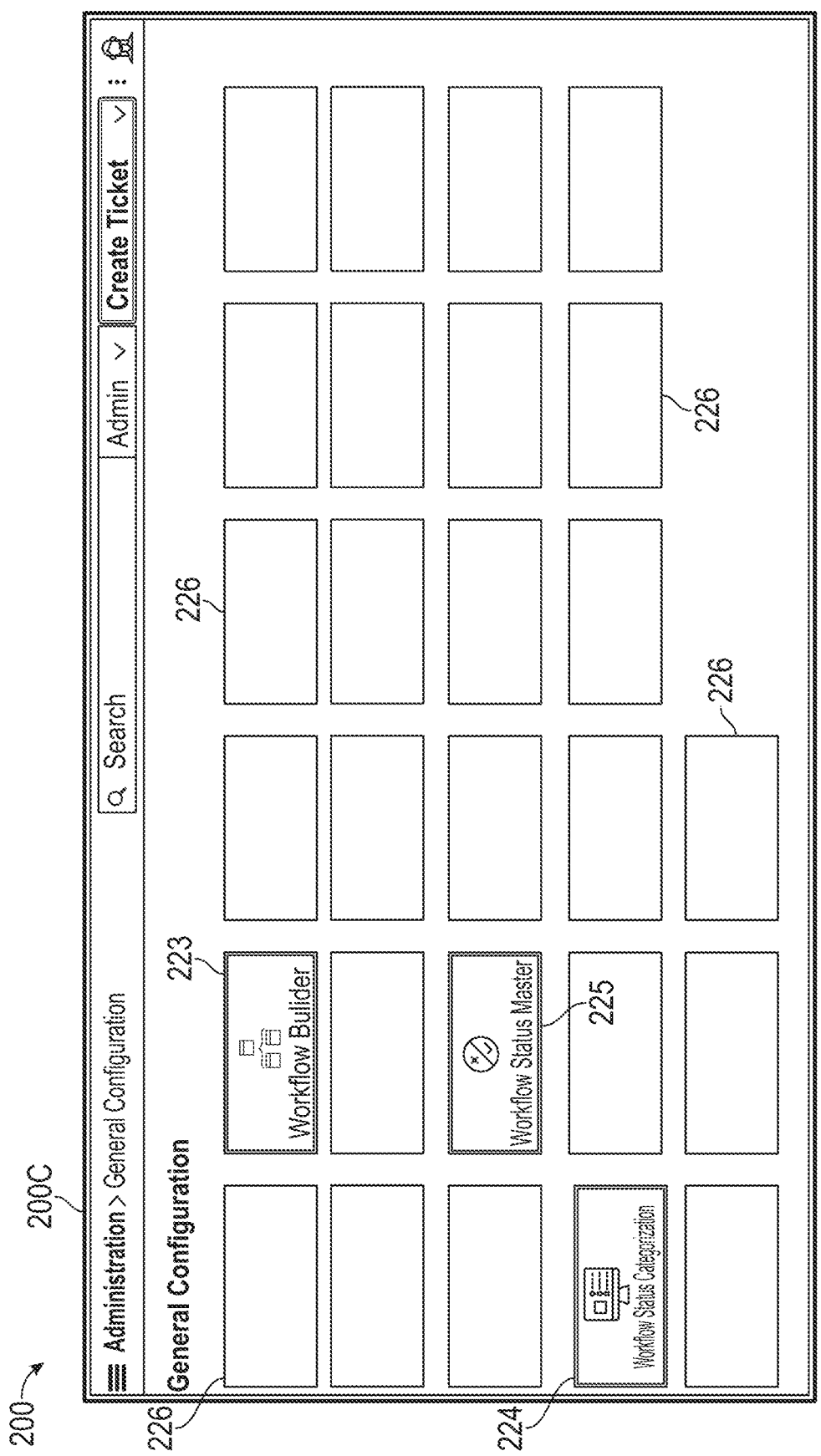
Figure 2D:
Figure 2E:
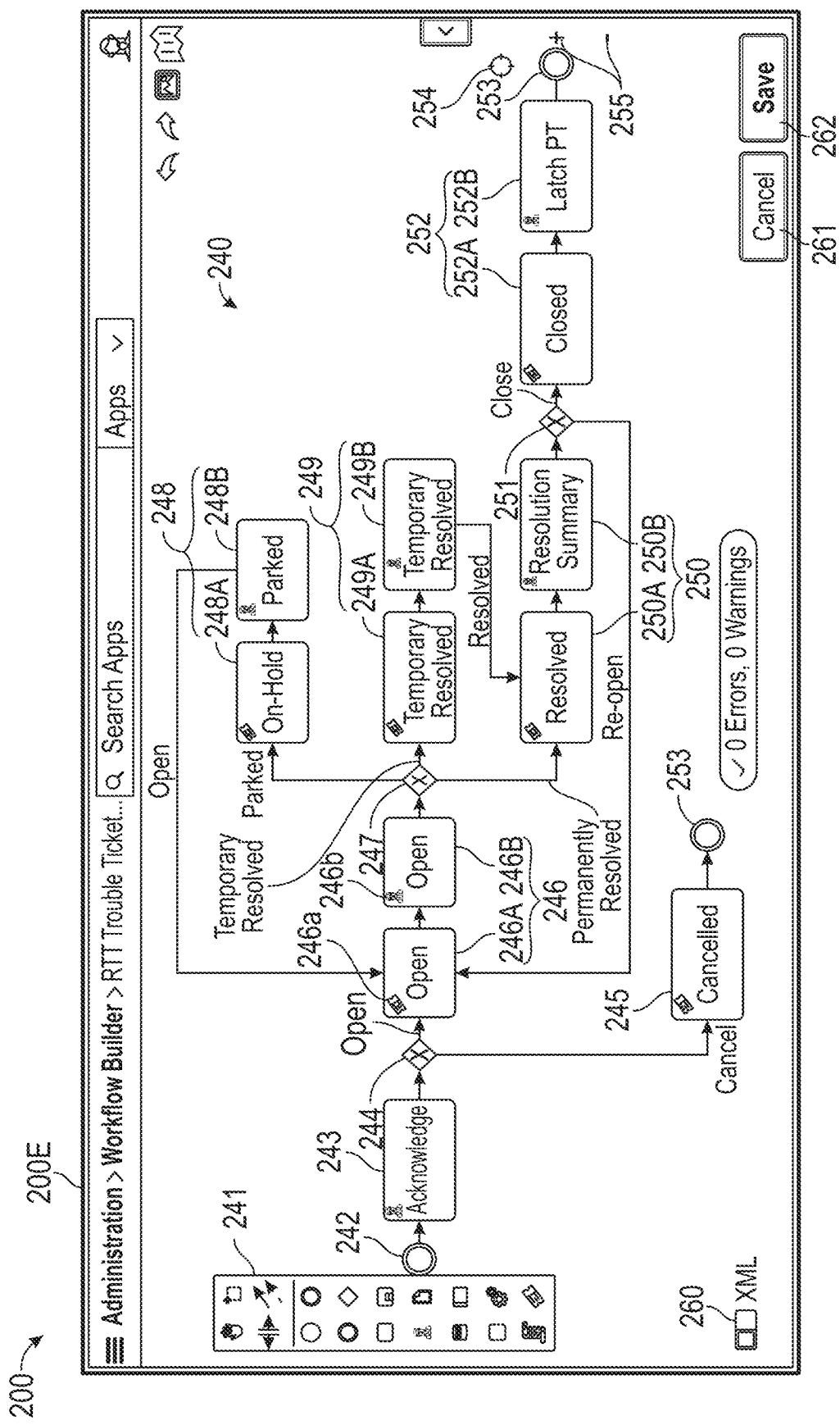
Figure 2I:
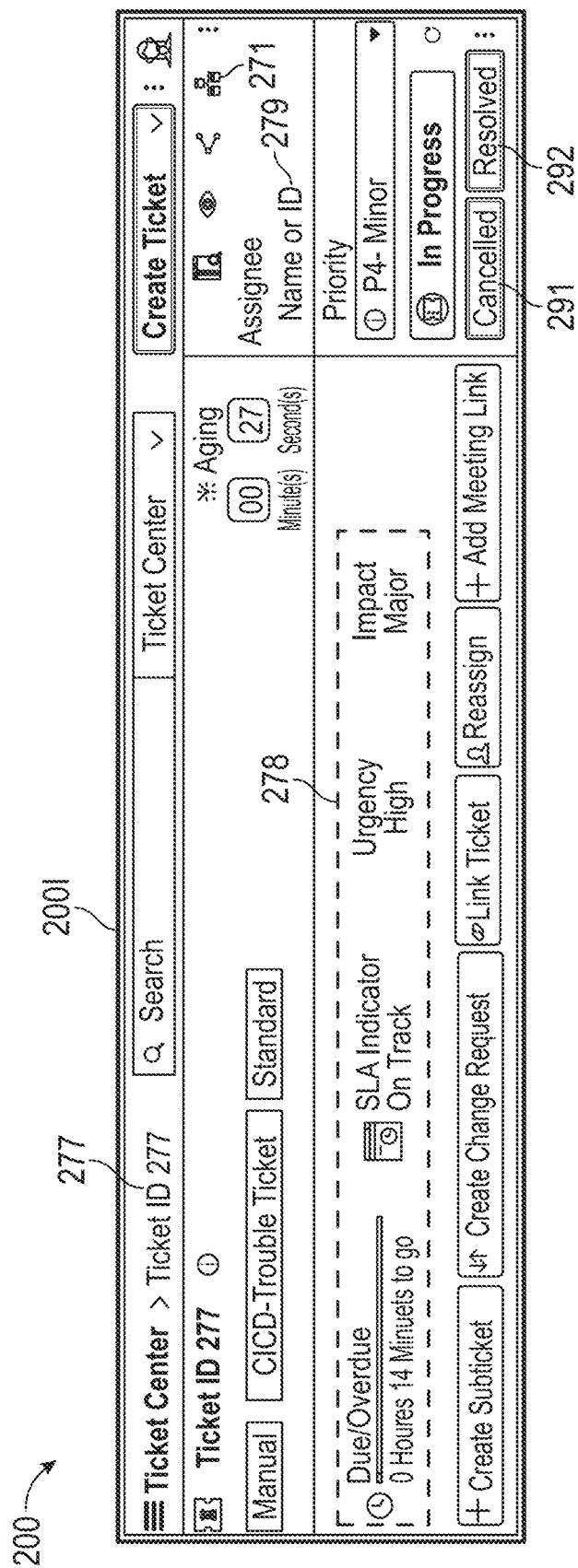
Figure 2J:
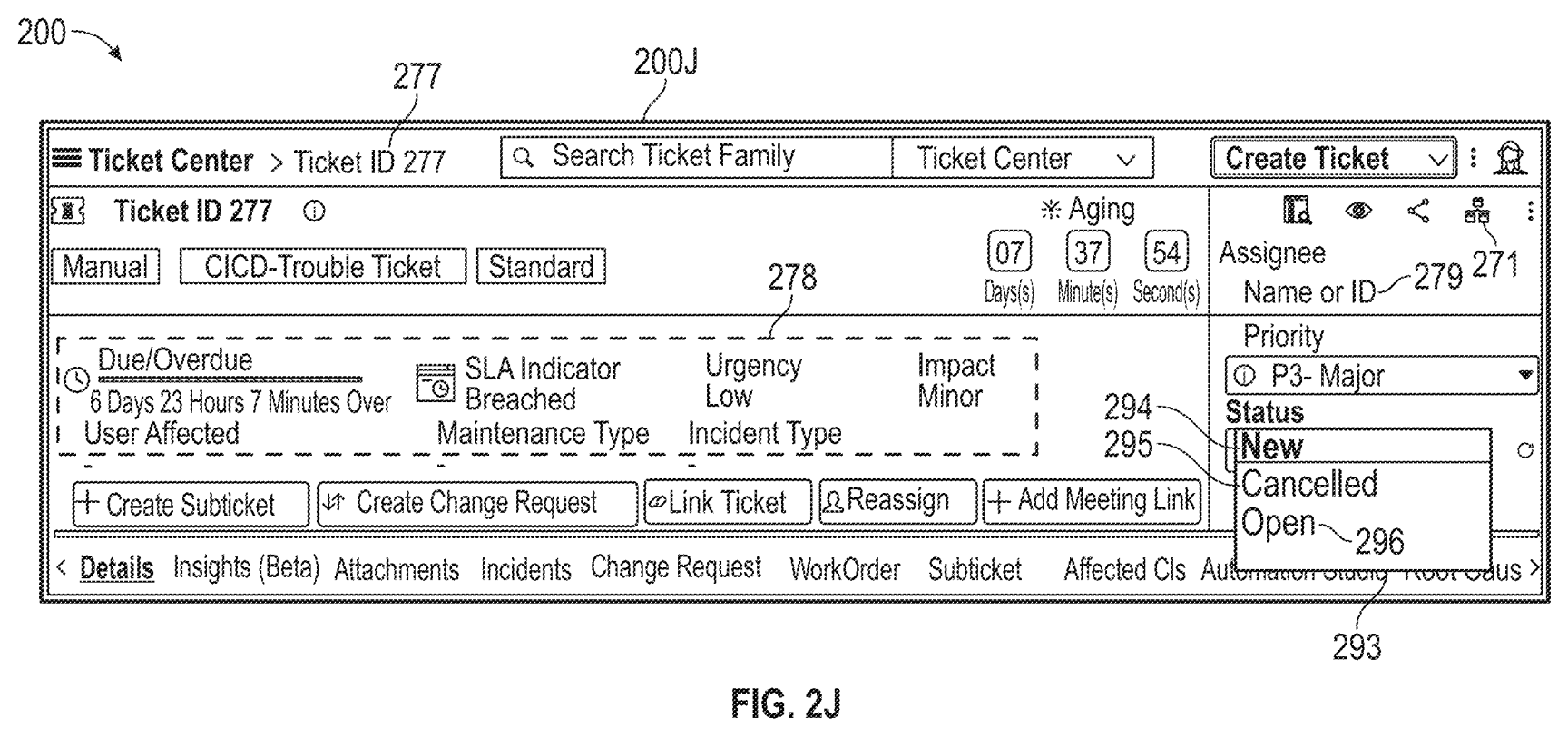
Figure 2K:
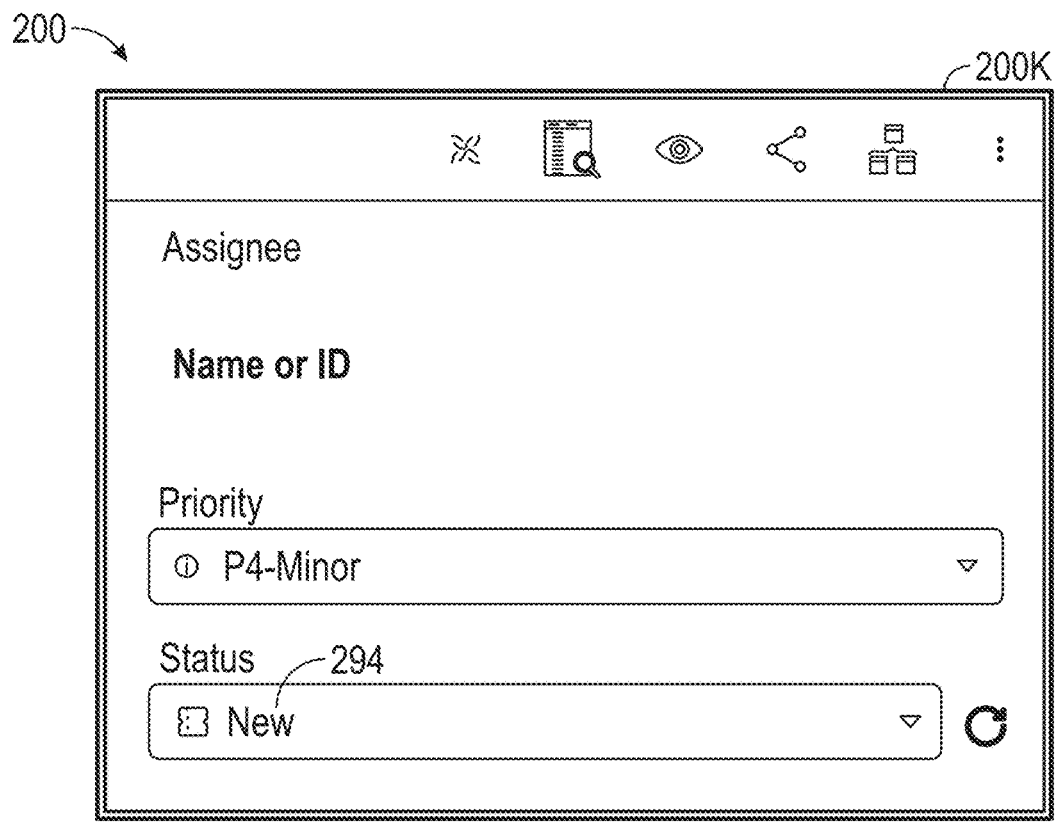
Figure 2L:
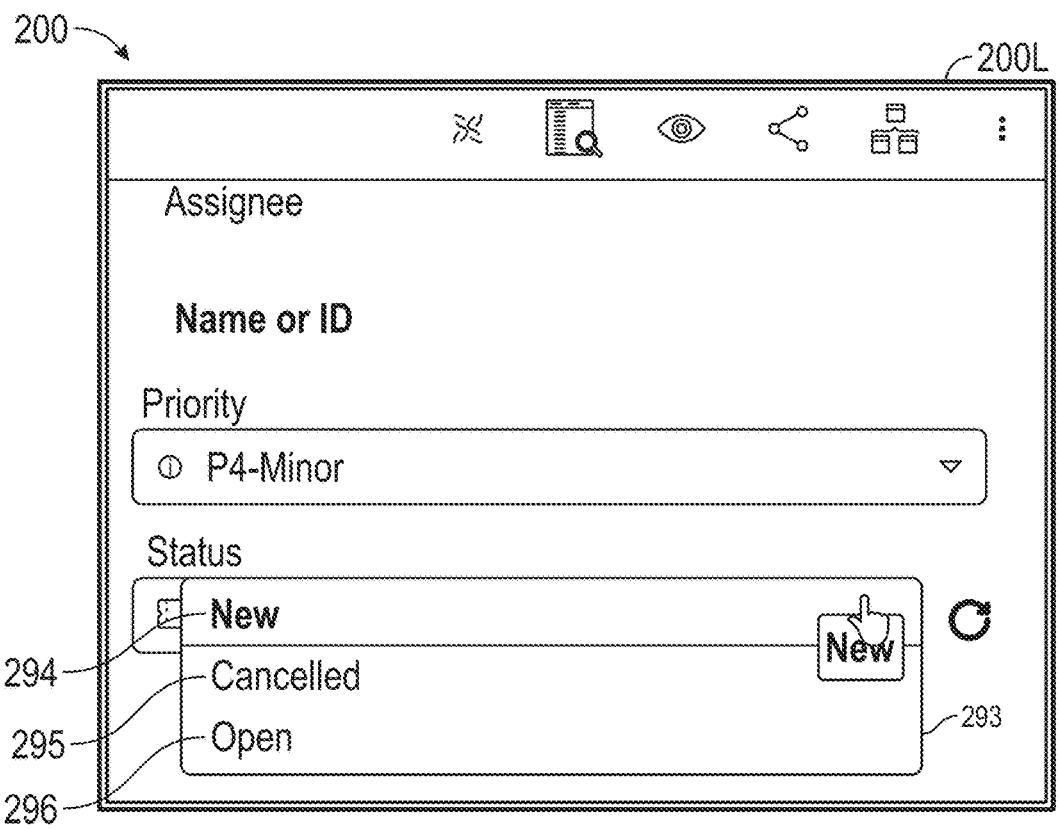
Figure 2M:
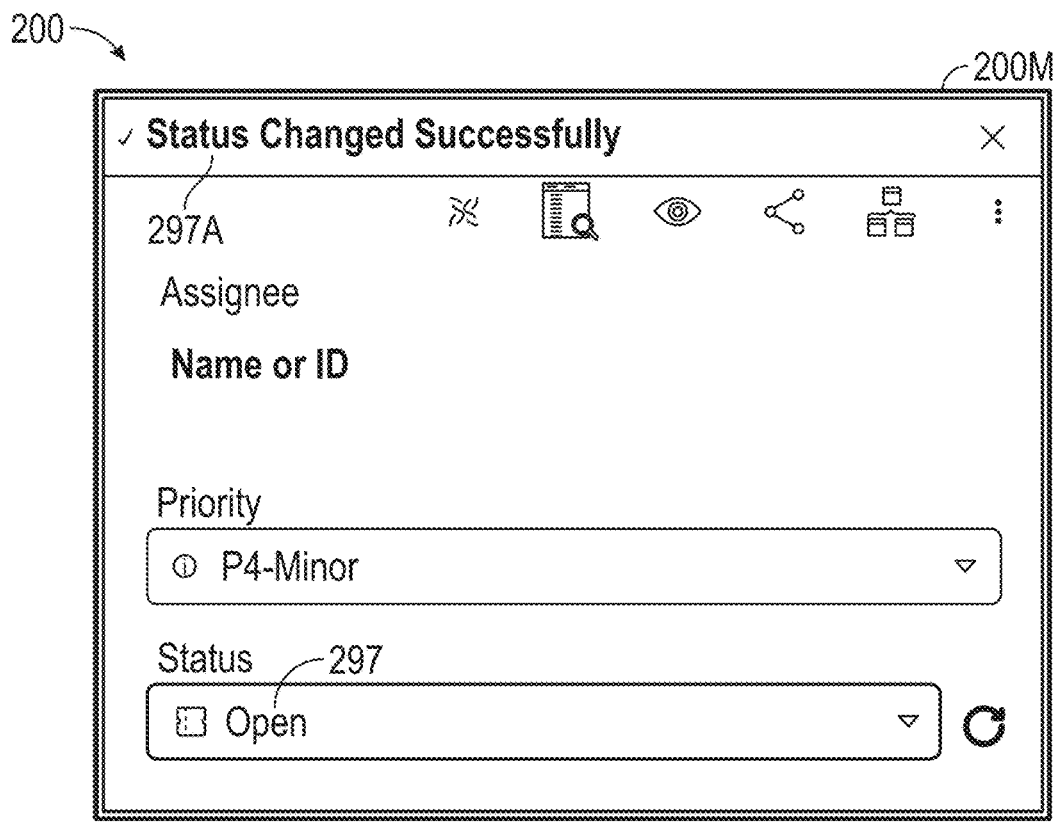
Figure 2N:
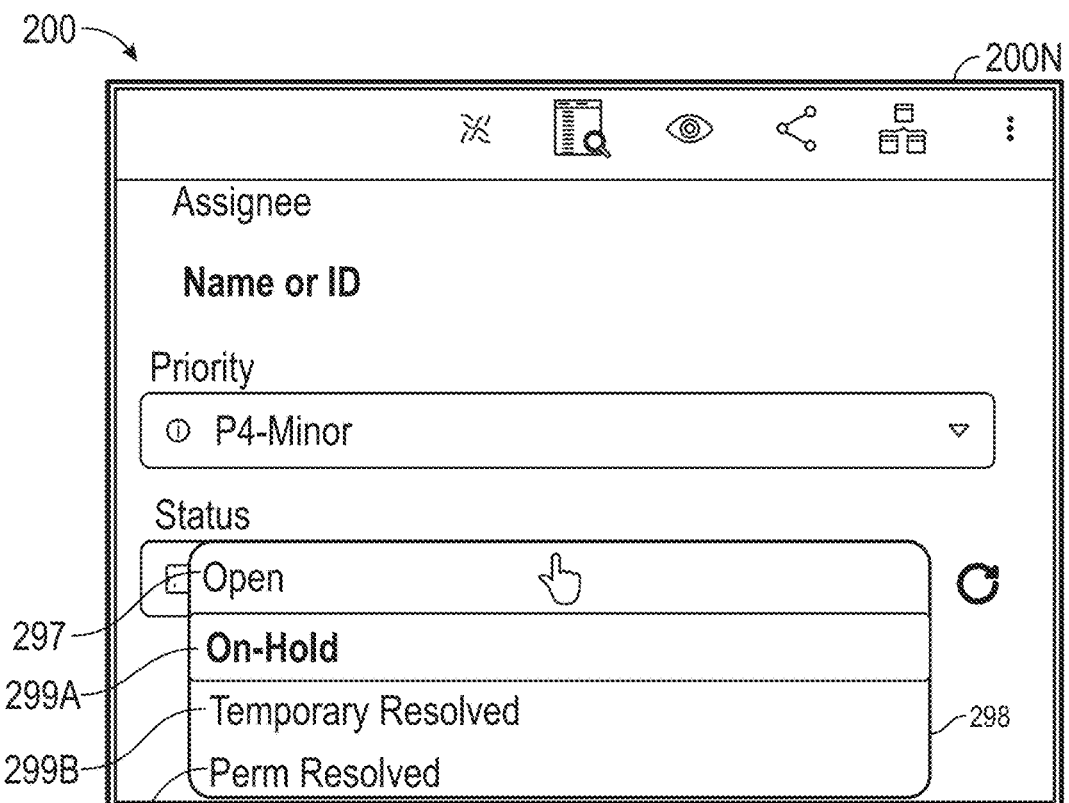

FIGS. 2A-2N are schematic diagrams showing various screens of a user interface 200 with customizable presentation of workflow transition, in accordance with some embodiments. In some embodiments, the user interface 200 is generated by the ticket management module 131 and/or the UI layer 140 based on data provided by the administration module 132. In at least one embodiment, the user interface 200 is visually presented at a device, e.g., a computer, of an administrator (or user) that hosts the microservices system 130 and/or UI layer 140, and/or at a device, e.g., a mobile equipment, of an end-user assigned by the microservices system 130 to handle a ticket. For simplicity, operations described herein are given for a situation where the user interface 200 is visually presented at an administrator's computer system; however, other situations are within the scopes of various embodiments. Further, operations described herein are performed by at least one hardware processor and/or computer system on which one or more of the described components and/or modules of the system 100 are implemented.

In FIG. 2A, a panel or screen 200A of the user interface 200 is displayed when a user, e.g., an administrator or someone who is authorized to create and manage tickets, logins the microservices system 130. Workflow data of a plurality of tickets are included in the screen 200A in the form of a table. Workflow data of each ticket are arranged in a corresponding of the table. Several tickets (rows) are numbered in the table, i.e., tickets 211-213. For simplicity, other tickets in the table are not numbered. For each ticket, the workflow data include a current status of the workflow, a ticket family to which the workflow belongs, a ticket ID, a ticket title, ticket aging, assignee(s), and ticket description correspondingly arranged in columns 201-207 of the table. Other workflow data are not illustrated in FIG. 2A, but are described herein. For example, the ticket 211 has the current status Open, belongs to the ticket family RTT-Trouble Ticket, and has a ticket ID RTT-2022-06-21-001871, a corresponding ticket title, aging of 1 hour 49 minutes (the amount of time the ticket has been left open), and no particular data with respect to assignees and ticket description.

The ticket status in column 201 indicates the current status of the ticket or corresponding workflow. When the workflow is moved to a new status, the ticket status in column 201 is updated accordingly, as described with respect to FIGS. 2E and 2I-2N. Tickets 211-213 have different statuses, i.e., Open, New, Resolved, respectively.

The ticket family in column 202 indicates a ticket family to which the ticket belongs. For example, tickets 211-213 all belong to the same ticket family RTT-Trouble Ticket. In some embodiments, the ticket family of a ticket is entered by a user, or given a default family, when the ticket is created, as described with respect to FIG. 2D. In some embodiments, the ticket family of a ticket is not used for workflow transition. In at least one embodiment, the ticket family provides a useful tool for creating reports. For example, a report for the ticket family RTT-Trouble Ticket would include various tickets in this ticket family, including tickets 211-213, while omitting tickets from other ticket families which may not be of particular interest to a user who wishes to review trouble tickets.

The ticket ID in column 203 is a human-understandable (or human-readable) ID associated with the process ID of each ticket. As described with respect to FIG. 3, a unique process ID is generated for each instance of a workflow, i.e., a unique process ID is generated for each ticket. In some embodiments, the process ID is automatically and/or randomly generated by a processor and is not understandable by human operators or users. In some embodiments, as described herein, upon receiving a unique process ID generated for a new ticket by the workflow builder 110 and received through the DWS module 133, the administration module 132 generates for the new ticket a human-understandable ticket ID, based on a predetermined naming convention. Thus, the ticket ID and the process ID are two identifications of the same ticket, wherein the process ID is used by at least one processor for service-to-service calling among different modules for executing/transiting the corresponding workflow; whereas the ticket ID provides human-understandable information for assisting a human user in identifying the ticket and/or differentiating it from other tickets. In the example configuration in FIG. 2A, the ticket ID of the ticket 211 is automatically generated based on a predetermined naming convention to include "RTT" indicating the ticket family of ticket 211, "2022 Jun. 21" indicating the day the ticket 211 was created, and "001871" indicating that the ticket 211 was the 1871$^{st}$ ticket generated on that day.

The ticket description in column 207 may be entered by a user when the user created a ticket, for example, as described with respect to FIG. 2D. The ticket description provides further human-understandable information about the ticket to assist in effective ticket management.

The screen 200A further includes a button 208 for creating a new ticket, a search bar 209 for searching for a particular ticket based on a known piece of workflow data, e.g., ticket ID, and a menu button 210. When the user selects the menu button 210, the user interface 200 proceeds to a screen 200B in FIG. 2B.

In FIG. 2B, the screen 200B of the user interface 200 includes a drop-down menu 215 which is displayed in response to the user's selection of the menu button 210. A plurality of menu items are included in the drop-down menu 215. For simplicity, details of various menu items 219 in the drop-down menu 215 are omitted. When the user selects a menu item Administration 220 in the drop-down menu 215, the user interface 200 proceeds to a screen 200C in FIG. 2C.

In FIG. 2C, the screen 200C of the user interface 200 includes a plurality of selectable menu items or buttons, including menu items Workflow Builder 223, Workflow Status Categorization 224, Workflow Status Master 225, and a number of other menu items 226 details of which are omitted for simplicity. In response to user selection of Workflow Builder 223, Workflow Status Categorization 224, or Workflow Status Master 225, the DWS module 133, status category module 134 or workflow status master module 135 described with respect to FIG. 1B is correspondingly executed or called. For example, when the user selects the Workflow Builder 223 to create a new workflow, the user interface 200 proceeds to a screen 200D in FIG. 2D.

In FIG. 2D, the screen 200D includes a plurality of input areas 230-237, a Cancel button 238, and a Create button 239. The input areas 230-234 are correspondingly for receiving user input of a name of the new workflow, a description of the new workflow, a type of a new ticket corresponding to the workflow, a ticket family to which the new ticket belongs, and a service level agreements (SLA) rule level. Generally, the name and description of the new workflow are chosen, e.g., entered, by the user in the input areas 230, 231 to be descriptive of the operation and/or purpose of the workflow. The ticket description entered in the input area 231 is reflected, when the new ticket is created, in column 207 in FIG. 2A. The input area 232 includes a drop-down menu that permits the user to select a desired ticket type for the new ticket. Example ticket types include, but are not limited to, a standard ticket, a sub ticket, a work order, or the like. The input area 233 includes a drop-down menu that permits the user to select a desired ticket family for the new ticket. The ticket family selected in the input area 233 is reflected, when the new ticket is created, in column 202 in FIG. 2A. The input area 234 includes a drop-down menu that permits the user to select a desired SLA rule level for the new ticket. The SLA rule level binds a workflow to a specification service level agreement. For example, if a ticket/workflow is not picked up by the assignee (end-user) in first 10 minutes by an acknowledgement SLA for that workflow, then the system (e.g., at least one processor that executes, or manages/monitors execution of, the workflow) will start raising a question, or will start sending out an email to the end-user and his manager that the SLA has been breached. A potential action by the system may be that the ticket needs to be now escalated to a higher SLA level, e.g., from level 1 (L1) to level 2 (L2).

The input area 235 is for receiving user input of a workflow transition setting (or a flag) based on which workflow transition options (or subsequent statuses in the workflow) will be displayed to the user in a corresponding, distinctive format, as described with respect to FIGS. 2I, 2J. In the example configuration in FIG. 2D, the input area 235 is in the form of a toggle button that permits the user to select one of two values for the workflow transition setting. For example, the workflow transition setting has a first value (e.g., True) when the toggle button is in a first state, and workflow transition options (subsequent statuses in the workflow) are displayed in the form of operable action buttons, as described with respect to FIG. 2I. The workflow transition setting has a second value (e.g., False) when the toggle button is in a second state, and workflow transition options (subsequent statuses in the workflow) are displayed in the form of selectable menu items in a drop-down menu, as described with respect to FIG. 2J. The described toggle button is an example. Other manners for entering or selecting values for the workflow transition setting are within the scopes of various embodiments. In an example, radio buttons (one of which is selectable at a time) are used instead of the toggle button. Further, although two values for the workflow transition setting are described, a different number of available values (e.g., three values or more) is possible for the workflow transition setting, based on which it is possible to display workflow transition options (subsequent statuses in the workflow) in more than two distinctive formats. In at least one embodiment, the configuration of the input area 235 as a toggle button provides the simplicity in that the way the workflow transition options (subsequent statuses in the workflow) are displayed, e.g., as action buttons or as menu items, may be selected simply by a single click.

The input area 236 is for receiving user input of a workflow template. In the example configuration in FIG. 2D, the input area 236 is in the form of a drop-down menu that permits the user to select a desired workflow template from a list of available workflow templates. In at least one embodiment, available workflow templates included in the input area 236 are retrieved from the template manager 114 of the workflow builder 110, through the DWS module 133. Other arrangement are within the scopes of various embodiments. When a workflow template is selected to be imported through the input area 236, a workflow corresponding to the template is displayed for the user's further customization. As an alternative to importing a workflow from a workflow template, the user may select to start from a blank workflow 237. Additional information of the workflow is enterable in one or more input areas below the input area 236 in FIG. 2D. Input areas for additional information are omitted in FIG. 2D, but examples of such input areas are illustrated in FIG. 2F. When the user selects the Cancel button 238, the workflow creation process is aborted. When the user selects the Create button 239, a blank workflow or a workflow corresponding to an imported template is displayed for further customization, for example, in a screen 200E in FIG. 2D.

In FIG. 2E, the screen 200E of the user interface 200 includes an example workflow 240 loaded from a workflow template and/or built/customized using various tools in a toolbar 241. In the example configuration in FIG. 2E, the workflow 240 is in compliance with the BPMN specification. Other workflow configurations and/or specifications are within the scopes of various embodiments. The capabilities to create and/or customize workflows directly inside the microservices system 130 are provided by the DWS module 133 which interfaces the workflow builder 110 and provides capabilities and functions of the workflow builder 110 to the microservices system 130.

The workflow 240 comprises a plurality of elements 242-253 arranged in a sequence determined by the user and/or a workflow template. The elements 242-253 are connected with each other by a plurality of connections (not numbered) to form a flowchart-type diagram that describes the corresponding workflow to be performed by one or more end-users and/or by the system. There are several types of elements in the workflow 240. For example, the elements 242, 253 are start and end elements corresponding to the start and end of the workflow. Complex workflows may have multiple start elements and/or multiple end elements. For example, the workflow 240 has two end elements 253. The other elements 243-252 include one or more statuses, user tasks, and/or gateways. In some embodiments, statuses are confirmed or updated by the system. In the example workflow 240, statuses are indicated by a ticket icon, such as, 246a, and include elements 245, 246A, 248A, 249A, 250A, 252A. In some embodiments, a user task is an activity or work that is to be executable or performed by the end-user. In the example workflow 240, user tasks are indicated by a human icon, such as 246b, and include elements 243, 246B, 248B, 249B, 250B, 252B. In some embodiments, a gateway defines a circumstance under which several options are available and require the end-user to select one of the options to continue the ticket journey. In the example workflow 240, gateways are indicated by an X sign inside a rhombus, and include elements 244, 247, 251. The described workflow configuration is an example. Other workflow configurations with different connections, and/or types of elements such as events, other types of gateways and/or tasks, are within the scopes of various embodiments.

The screen 200E further comprises a toggle button 260, a Cancel button 261, and a Save button 262. When the toggle button 260 is selected by the user, the workflow 240 is switched from the graphic presentation as illustrated in FIG. 2E to a source code form, where a workflow configuration of the workflow 240 is presented in XML code. When the toggle button 260 is selected by the user again, the workflow 240 is switched back to the graphic presentation illustrated in FIG. 2E. When the user selects the Cancel button 261, the workflow creation process is aborted, or process returns to the previous screen. When the user selects the Save button 262, the workflow 240 (e.g., its workflow configuration in XML code) is saved in a database, e.g., the WFB database 116 of the workflow builder 110. The saving of the workflow 240 further causes automatic generation of a process ID corresponding to the new workflow/ticket, as described with respect to FIG. 3. When the workflow 240 is executed, e.g., at a mobile equipment of an end-user, it progresses as described with respect to FIGS. 2K-2N.

In some embodiments, it is possible to edit settings and/or workflow data related to a workflow while the workflow is being built, and/or after the workflow has been created and saved. For example, when the user selects a ticket or workflow in another screen of the user interface 200, and further selects an Edit option, the user interface 200 proceeds to a screen 200F in FIG. 2F. In some embodiments, the screen 200F is displayed over another, underlying screen of the user interface 200. For simplicity, such an underlying screen is omitted in FIG. 2F.

In FIG. 2F, the screen 200F permits the user to edit settings and/or workflow data related to a workflow. The screen 200F includes various input areas similar to those described with respect to the screen 200D in FIG. 2D. For example, it is possible to edit the name and description of the workflow, the ticket family to which the workflow belongs, the workflow transition setting, and additional information correspondingly at the input areas 230, 231, 233, 235, 263. In the example configuration in FIG. 2F, the ticket type is not editable because the corresponding input area 232 is greyed out. When the user selects a Cancel button 264, the editing process is aborted and no changes are made to the existing workflow. When the user selects a button 265, the process proceeds to the workflow builder, e.g., to the screen 200E for further customization of the workflow. When the user selects an Update button 266, the changes to the settings and/or workflow data of the workflow are updated and saved in corresponding databases, e.g., the database 136 and/or the WFB database 116.

In FIG. 2G, a screen 200G is displayed in response to user selection of the Workflow Status Categorization 224 in the screen 200C. For example, user selection of the Workflow Status Categorization 224 causes the status category module 134 to be executed and display the screen 200G. The screen 200G includes input areas 270, 272, an Active button 273, a Cancel button 275, and a Create button 276. The screen 200G permits the user to create a new status category. Specifically, a name and a description of a new status category are chosen, e.g., entered, by the user correspondingly in the input areas 270, 272, e.g., to be descriptive of the purpose of the new status category. The Active button 273 defines whether or not the new status category is active and available for selection when a new workflow status is created. When the user selects the Cancel button 275, the process of creating a new status category is aborted. When the user selects the Create button 276, the newly created status category is created. The new status category is saved in the database 136 and becomes available for selection (e.g., the name of the new status category is displayed) when a workflow status is created, as described with respect to FIG. 2H.

In FIG. 2H, a screen 200H is displayed in response to user selection of the Workflow Status Master 225 in the screen 200C. For example, user selection of the Workflow Status Master 225 causes the workflow status master module 135 to be executed and display the screen 200H. The screen 200H includes input areas 280-282, an Active button 283, a Color selector 284, a Cancel button 285, and a Create button 286. The screen 200H permits the user to create a new workflow status under an existing status category. Specifically, a name and a description of a new workflow status are chosen, e.g., entered, by the user correspondingly in the input areas 280, 282, e.g., to be descriptive of the new workflow status. The input area 281 includes a drop-down menu for selection of a status category from a list of existing status categories. Any new status category created by the status category module 134 and/or in the screen 200G is included in such a list. The Active button 283 defines whether the new workflow status is active and available for selection when a workflow is created or edited. The Color selector 284 includes a drop-down menu for selection of a color, from a color list, for the new workflow status. The selected color would be used to visually present one or more elements corresponding to the new workflow status in a workflow. The new workflow status is created and saved in the database 136. The saved new workflow status, as well as built-in and/or pre-existing workflow statuses which are active, are selectable and assignable by the user to one or more elements in a workflow. When a workflow status is selected and assigned to an element in a workflow, the name of the workflow status will be displayed for this element in the workflow, instead of a built-in or default workflow status. As a result, customized labels and/or statuses created through the screen 200H are displayed to the end-user.

In some embodiments, the capability to customize status categories and/or workflow statuses under each status category permits a user to customize workflows, labels, statuses to give meaningful information to an end-user who may find it difficult to understand the meaning of built-in statuses. For example, Open is a built-in status category, which may also be used as a workflow status displayed in a workflow for selection by an end-user. The end-user may find the meaning of status Open vague, and may make a wrong selection due to the vague understanding/meaning of status Open. In some embodiments, by executing the workflow status master module 135, it is possible for a user to create one or more new workflow statuses, for example, Accept and/or Acknowledge, under the status category Open. In a workflow including one or more elements assigned with status Open, depending on the workflow configuration, status Accept or Acknowledge, instead of status Open, is displayed to an end-user. To the system (e.g., a processor executing the workflow in a workflow engine), both statuses Accept and Acknowledge have the same meaning as status Open, and the system behaves in the same way when the status/element is selected for workflow transition, regardless of whether it is displayed as Open, Accept or Acknowledge. However, to the end-user, the meaning of the customized status Accept or Acknowledge (i.e., I accept or I acknowledge the ticket) may be clearer than status Open (i.e., it may be unclear to the end-user what is opened). As a result, customized statuses help the end-user to better understand statuses presented for selection in workflow transition, and to make correct/desired selections for workflow transition. In at least one embodiment, it is possible to reduce human errors in workflow transition and/or to reduce the time needed to resolve a ticket. The described specific status category and workflow statuses are examples. Other status categories and/or workflow statuses are within the scopes of various embodiments. For example, other statuses include, but are not limited to, Resolved, New, Cancelled, Active, or the like. It is possible to create additional/alternative statuses to used (i.e., displayed in a workflow) instead of one or more of the statuses Resolved, New, Cancelled, Active. For example, a customized status Rejected may be created under the same status category as status Cancelled, and may be used instead of status Cancelled in a workflow. Other customized statuses are displayed in the workflow 240 in FIG. 2E. For example, Parked at element 248B may be a customized status having, to the system, the same meaning as On-Hold at element 248A. For another example, Resolution Summary at element 250B may be a customized status having, to the system, the same meaning as Resolved at element 250A. For yet another example, Latch PT (problem ticket) at element 252B may be a customized status having, to the system, the same meaning as Closed at element 252A. Compared to the default or built-in statuses Resolved and Closed, the customized statuses Resolution Summary and Latch PT provide additional information to the end-user with respect to what is needed to be done, resulting in an intuitive and easy-to-understand user input experience.

In FIG. 2I, a portion of a screen 200I is illustrated. The screen 200I is displayed by the user interface 200 when a workflow is executed, e.g., by a processor implementing a workflow engine. The screen 200I is displayed at a computer device of a user or administrator at the microservices system 130, or at a computer device, e.g., mobile equipment, of an end-user assigned to handle a ticket corresponding to the workflow.

The screen 200I comprises a ticket ID 277 of the ticket being executed, a region 278 showing workflow data related to the ticket/workflow, a name or user ID 279 of the assignee or end-user to whom the ticket is assigned. The screen 200I further comprises an icon 271 upon user selection of which a graphic presentation of the workflow being executed similar to that described with respect to the workflow 240 in FIG. 2E will be displayed, e.g., in a pop-up panel or window, to help the user or end-user to visualize the progress of the workflow. It is possible to return to the screen 200I, e.g., by closing off the pop-up panel or window with the graphic presentation of the workflow.

The screen 200I further comprises a current status 290, i.e., In Progress, of the workflow, as well as two subsequent statuses 291, 292, i.e., Cancelled and Resolved, following the current status 290. The subsequent statuses 291, 292 are displayed, based on the corresponding workflow, as available options for workflow transition from the current status 290. A region of the screen 200I that comprises the statuses 291, 292 corresponds to a workflow transition input area for receiving user input of a workflow transition to be made. In at least one embodiment, one or more of statuses In Progress, Cancelled and Resolved are customized statuses created by the workflow status master module 135 as described herein.

In the screen 200I, the format in which the subsequent statuses 291, 292 (or available workflow transition options) are displayed corresponds to a first value of the workflow transition setting defined as described with respect to FIG. 2D or 2F. Specifically, the subsequent statuses 291, 292 are each displayed as an operable action button. Upon user operation of one of the action buttons, e.g., action button 291, the workflow proceeds to the corresponding status, i.e., Cancelled. In some embodiments, the action button displaying format in FIG. 2I reduces the likelihood of user selection of a wrong workflow transition option, which may be a potential case (e.g., due to a mouse slip) when workflow transition options are displayed in a menu as described with respect to FIG. 2J.

In FIG. 2J, a portion of a screen 200J is illustrated. The screen 200J is similar to the screen 200I, and is displayed by the user interface 200 when a workflow is executed. A difference between the screen 200J and the screen 200I is that, in the screen 200J, a current status 294 (i.e., New), and subsequent statuses 295, 296 (i.e., Cancelled, Open) are displayed in a format distinctive from the format in the screen 200I. Specifically, in the screen 200J, the format in which the subsequent statuses 295, 296 (or available workflow transition options) are displayed corresponds to a second, different value of the workflow transition setting defined as described with respect to FIG. 2D or 2F. The current status 294 is displayed as a visible item of a drop-down menu 293. Upon user selection of the current status 294, the drop-down menu 293 is developed to show subsequent statuses 295, 296 as selectable menu items. Upon user selection of one of the menu items, e.g., menu item 295, the workflow proceeds to the corresponding status, i.e., Cancelled. A region of the screen 200J that comprises the statuses 295, 296 corresponds to a workflow transition input area for receiving user input of a workflow transition to be made. In some situations, the user selection may not be accurate, resulting in a wrong menu item (i.e., wrong workflow transition option) being selected. This situation may be avoidable by changing the workflow transition setting to a different value to cause the user interface 200 to display the subsequent statuses differently, as described with respect to FIG. 2I. Nevertheless, there are situations or users/end-users for which the drop-down menu format described with respect to FIG. 2J is preferred to the action button format described with respect to FIG. 2I. The described drop-down menu is an example. Other types of menu, e.g., a pop-up menu, a pull-down menu, or the like, are usable in place of the drop-down menu 293. In at least one embodiment, the flexibility of various formats for displaying available workflow transition options and/or the ease with which the displaying format may be changed are advantages over other approaches where such flexibility/ease is not offered.

In FIGS. 2K-2N, portions of various screens 200K-200N are illustrated. The screen portions in FIGS. 2K-2N correspond to the portions in FIG. 2I-2J where a current status and one or more subsequent statuses are displayed. The screens 200K-200N correspond to various workflow transitions when the workflow 240 in FIG. 2D is executed, e.g., by a processor implementing a workflow engine. The screens 200K-200N are displayed at a computer device of a user or administrator at the microservices system 130, or at a computer device, e.g., mobile equipment, of an end-user assigned to handle a ticket corresponding to the workflow 240.

In FIG. 2K, when the workflow 240 is started at the start element 242, a default status New is automatically adopted by the system (e.g., a processor executing the workflow 240 in a workflow engine) and the workflow 240 automatically progress from the start element 242 to element 243, which is a user task. The adopted status New is displayed as the current status 294 in FIG. 2K.

In FIG. 2L, when the user selects the current status 294, the gateway 244, which is the element subsequent to the element 243 in the sequence of the workflow 240, is executed. The executed gateway 244 provides the user with two available options for workflow transition, i.e., statuses 295, 296 (i.e., Cancelled, Open) corresponding to elements 245 and 246A which are subsequent elements to the gateway 244 in the workflow 240. When the user selects status 296 (i.e., Open) from the drop-down menu 293, the user interface 200 proceeds to the screen 200M in FIG. 2M.

In FIG. 2M, in response to the user selection of status 296 (i.e., Open), the workflow 240 progresses to the corresponding subsequent element 246A where the system updates the current status to be Open. This status update is shown at 297A in the screen 200M. A new current status 297, i.e., Open, corresponding to the status of the element 246A is displayed in the screen 200M. The workflow 240 automatically progresses to the subsequent element in accordance with the sequence in the workflow 240, i.e., to element 246B which is a user task.

In FIG. 2N, when the user selects the current status 297, the gateway 247, which is the element subsequent to the element 246B in the sequence of the workflow 240, is executed. The executed gateway 247 provides the user with three available options for workflow transition, i.e., statuses 299A, 299B, 299C (i.e., On-Hold, Temporary Resolved, Perm Resolved) corresponding to elements 248A, 249A, 250A which are subsequent elements to the gateway 247 in the workflow 240.

Figure 3:
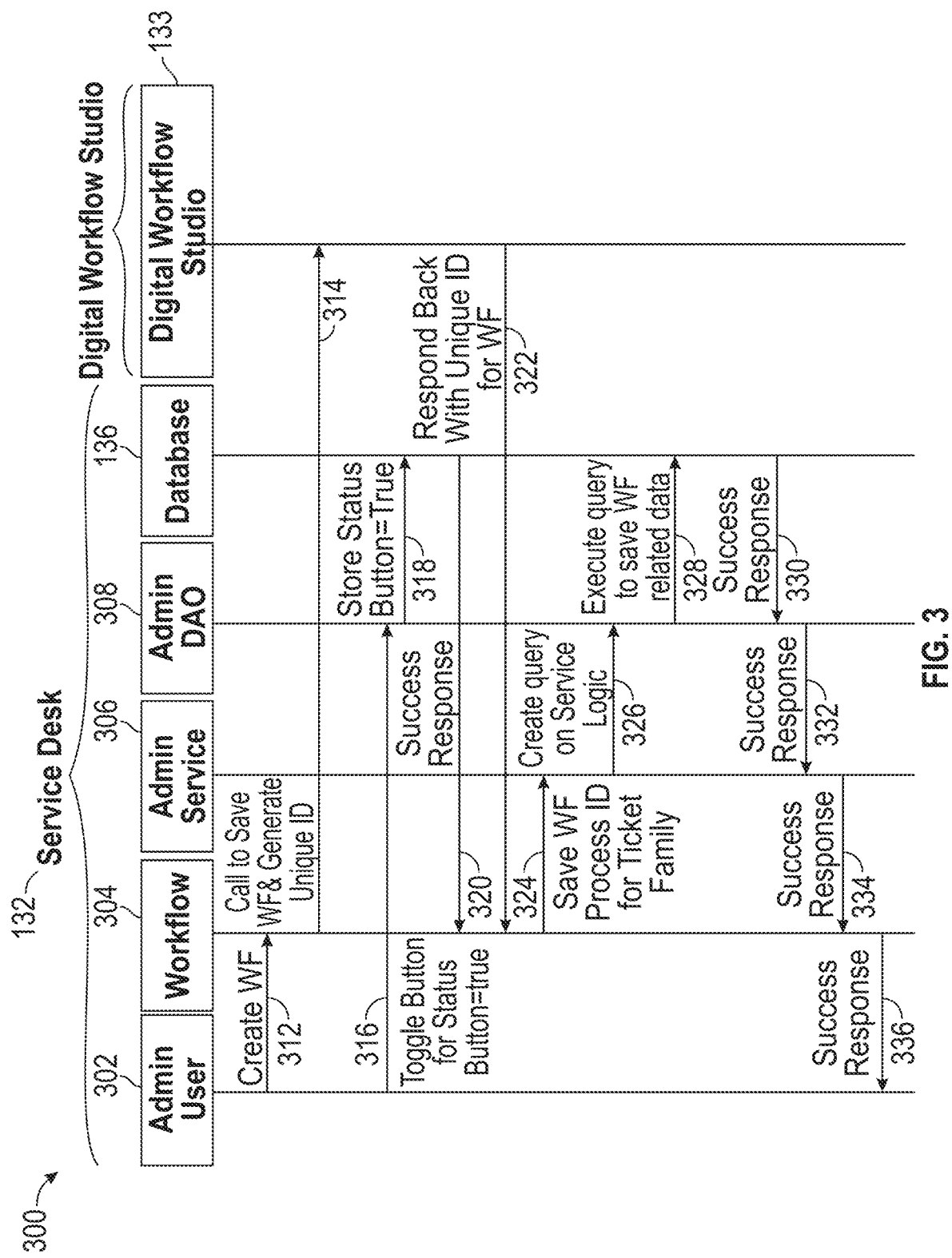
FIG. 3 is a schematic flow diagram of operations in a system for customizable presentation of workflow transition in accordance with some embodiments.

Although not illustrated, the following may happen. When the user selects status 299A (i.e., On-Hold) from a drop-down menu 298 including the statuses 299A, 299B, 299C, the workflow 240 progresses to the corresponding element 248A. The system updates the current status to be a new status On-Hold then automatically progresses to the subsequent element 248B. At this point the user will be presented with a screen showing the current status On-Hold. When the user selects the displayed status On-Hold, a drop-down menu is developed and reveals a single option for workflow transition, i.e., status Open corresponding to the subsequent element 246A in the sequence of the workflow 240 from the element 248B. Further workflow transitions occur similarly, and are not described in detail herein. The workflow transitions described with respect to FIGS. 2K-2N are given for a situation where the workflow transition input area is displayed in the form of drop-down menus. The workflow transitions are similarly performed when the workflow transition input area is displayed in the form of action buttons, as described herein, FIG. 3 is a schematic flow diagram 300 of operations in a system for customizable presentation of workflow transition, in accordance with some embodiments. In some embodiments, the flow diagram 300 corresponds to operations at the microservices system 130 described with respect to FIGS. 1A-1B.

An administrator user 302 logs in the microservices system 130.

At operation 312, the administrator user 302 proceeds to create a new workflow 304, for example, as described with respect to one or more of FIGS. 2D-2F.

At operation 314, when the administrator user 302 selects to save the created new workflow 304, an API call is made to the DWS module 133 to request the new workflow 304 to be saved, and a unique process ID to be generated for a new ticket corresponding to the new workflow 304. In some embodiments, the DWS module 133 interfaces the workflow builder 110 to save the new workflow 304 in the WFB database 116 of the workflow builder 110, and forward the unique process ID generated by the workflow builder 110 for the new ticket to the administration module 132, as illustrated at operation 322.

At operation 316, when the administrator user 302 sets the workflow transition setting (e.g., a toggle button) to a first state/value as described with respect to FIGS. 2D, 2F, the value of the workflow transition setting is sent to an Admin DAO (Data Access Object) 308 which is a Java DAO in the administration module 132. The Admin DAO 308 is operable to store the value of the workflow transition setting in the database 136.

At operation 320, a success acknowledgement is output from database 136, confirming that the value of the workflow transition setting has been successfully stored.

At operation 324, in response to receipt of the unique process ID from the DWS module 133, a request is sent to an Admin Service 306, which is a module in the administration module 132, requesting the unique process ID to be stored for the ticket family associated with the new ticket.

At operation 326, the Admin Service 306 creates a query on service logic and causes the Admin DAO 308, at operation 328, to execute the query to store the process ID and workflow data related to the new ticket in the database 136. In some embodiments, the process ID is required to run or execute the corresponding workflow. Workflow data stored with the process ID include, but are not limited to, ticket family ID, ticket type, or the like. The uniqueness of the process ID, which is unique for every instance of a workflow, makes it possible, in one or more embodiments, to identify service-to-service communication through this process ID.

At operations 330, 332, 334, 336, several success acknowledgements are sequentially output from the database 136, Admin DAO 308, Admin Service 306, and new workflow 304 to confirm with the administrator user 302 that the new ticket has been successfully created and saved. The described sequences of operations are examples. Other sequences of operations are within the scopes of various embodiments.

Figure 4:
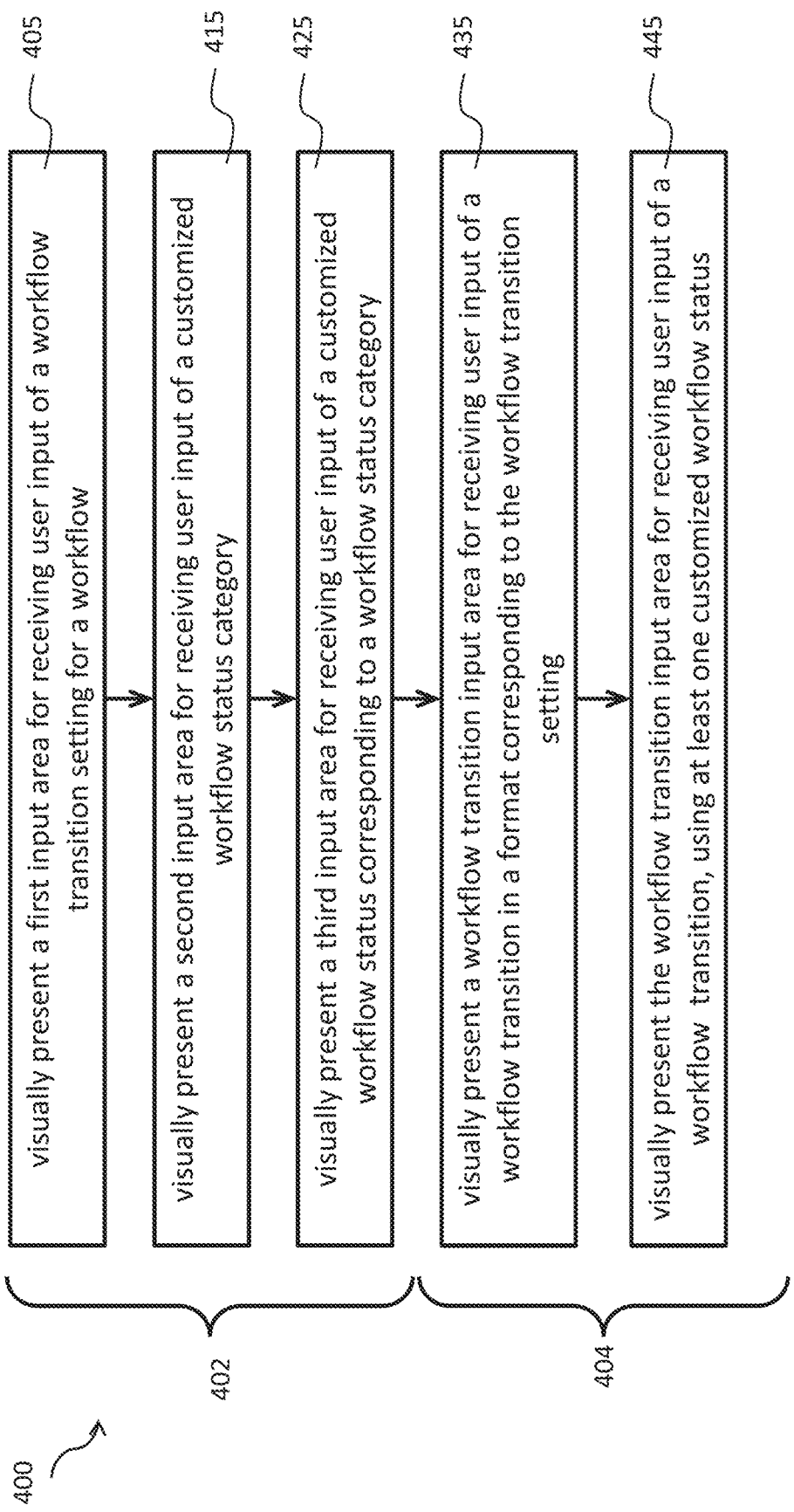
FIG. 4 is a flow chart of a various process for customizable presentation of workflow transition, in accordance with some embodiments.

FIG. 4 is a flow chart of a process 400 for customizable presentation of workflow transition, in accordance with some embodiments. In some embodiments, the 400 is executed by at least one processor that implement one or more components of the system 100, such as the microservices system 130, and include one or more operations and/or functions described with respect to FIGS. 2A-2N and 3.

The process 400 includes a workflow creation and/or customization stage 402, and a workflow execution stage 404. The workflow creation and/or customization stage 402 comprises operations 405, 415, 425 which, in one or more embodiments, are not necessarily performed in the specific sequence shown in FIG. 4. The workflow execution stage 404 comprises operations 435, 445 which, in one or more embodiments, are not necessarily performed in the specific sequence shown in FIG. 4. In some embodiments, one or more of the operations in the process 400 is/are omitted. For example, in at least one embodiment, one or more of operations 415, 425, 445 is/are omitted.

At operation 405, a first input area is visually presented for receiving user input of a workflow transition setting for a workflow, for example, as described with respect to FIGS. 2D, 2F.

At operation 415, a second input area is visually presented for receiving user input of a customized workflow status category, for example, as described with respect to FIG. 2G.

At operation 425, a third input area is visually presented for receiving user input of a customized workflow status corresponding to a workflow status category, for example, as described with respect to FIG. 2H.

At operation 435, a workflow transition input area is visually presented for receiving user input of a workflow transition in a format corresponding to the workflow transition setting. For example, in response in response to the workflow transition setting having a first value (e.g., True), the workflow transition input area is visually presented in a first format, e.g., with operable action buttons as described with respect to FIG. 2I. In response to the workflow transition setting having a second value (e.g., False) different from the first value, the workflow transition input area is visually presented in a second format distinctive from the first format, e.g., with a drop-down menu having selectable menu items as described with respect to FIG. 2J.

At operation 445, the workflow transition input area is visually presented for receiving user input of a workflow transition, using at least one customized workflow status. For example, as described with respect to one or more of FIGS. 2G-2N, at least one customized workflow status is displayed as a subsequent status to be selected by a user in a workflow transition.

In one or more other approaches, workflows move through statuses, back and forward, by the end user selecting a next or a previous status as defined in the process. The implementation is such that, to enable the change in the status, a custom form is to be latched to a button. In some situations, the end user might select a wrong status (human error), and/or ticket lifecycle management across tools takes a few clicks, and/or configuring buttons requires additional custom pages to be created and latched to the buttons to transit between statuses. One or more or all of these drawbacks are avoidable in one or more embodiments.

In some embodiments, an engine, e.g., a BPMN engine, is used as the core of a Workflow Builder (e.g., as the DWS module 133) and further enhances workflow transition from one status to another, using action buttons without the need to attach any custom forms.

In some embodiments, the ticket lifecycle is manageable through user tasks, which may be Status driven (e.g., by selecting a Status from a menu) or Action driven (e.g., by operating an action button).

In some embodiments, when a page or form or additional information is required, the user may attach the required page or form or additional information directly to the user task in the workflow, without the need to attach it separately to an action button. For example, in the workflow 240 in FIG. 2E, the element 252B is a user task that asks the end-user to attach a problem ticket (PT) to give the administrator team more information when the end-user selects to close the ticket. In at least one embodiment, the end-user may attach a view, a document, a report, or a summary to this user task, without the need to attach it separately to an action button.

In some embodiments, the capabilities to customize how options for workflow transition are presented to the user are configured in, or in association with, the workflow.

In some embodiments, the change of status, e.g., workflow transition, may be done through a single click (e.g., user operation of a designed action button), and/or chances of human error are reduced with customized naming (customized statuses) for the action buttons.

In some embodiments, a workflow in a microservices system 130 and/or administration module 132 comprises a set of statuses and transitions that a ticket moves through during its lifecycle. The administration module 132 is integrated with the DWS module 133 to leverage its capabilities and build upon the use cases of a ticket management system.

In some embodiments, workflows are associated with a ticket family. A ticket family is a basic entity and is defined as the business process as per the user's organization or department. Workflows are latched to a ticket family to initiate the lifecycle of a ticket.

In some embodiments, in a ticket journey, users may change the status by using a drop-down menu option. For an alternative, or better, user experience, a toggle button is enabled in every individual workflow setting, which by enabling, will change the status upon a click (e.g., user operation) on an action button. In at least one embodiment, names of action buttons are customizable as required.

In some embodiments, a newly created ticket has status New by default. The ticket is assigned to an end-user or a workgroup by the creator (e.g., administrator) of the ticket. The assignee/end-user, as an acknowledgment, changes the status from New to Open, or from New to Cancelled. The Open and Cancelled actions/statuses are made available in the form of action buttons with customized names/statuses, e.g., Accept and Reject, respectively. Accept status or button, when selected/operated, will change the status of the workflow to Open, i.e., the assignee is performing the required operation on the ticket. Reject status or button, when selected/operated, will change the status to Cancelled, when the assignee deems the ticket invalid.

In some embodiments, with the described dual workflow capabilities, it provides flexibility to the user to choose an approach to follow for ticket lifecycle management. In at least one embodiment, the time required to resolve a ticket is reduced, and/or the number of cases that are mismanaged due to human error is also reduced.

In some embodiments, an end-user does not see ticket family or status categories which are used by administrators for reporting and/or for building assignment logic. For example, in at least one embodiment, there are use cases where status categories, rather than statuses, are used in order to separate the information within the application interface.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 5:
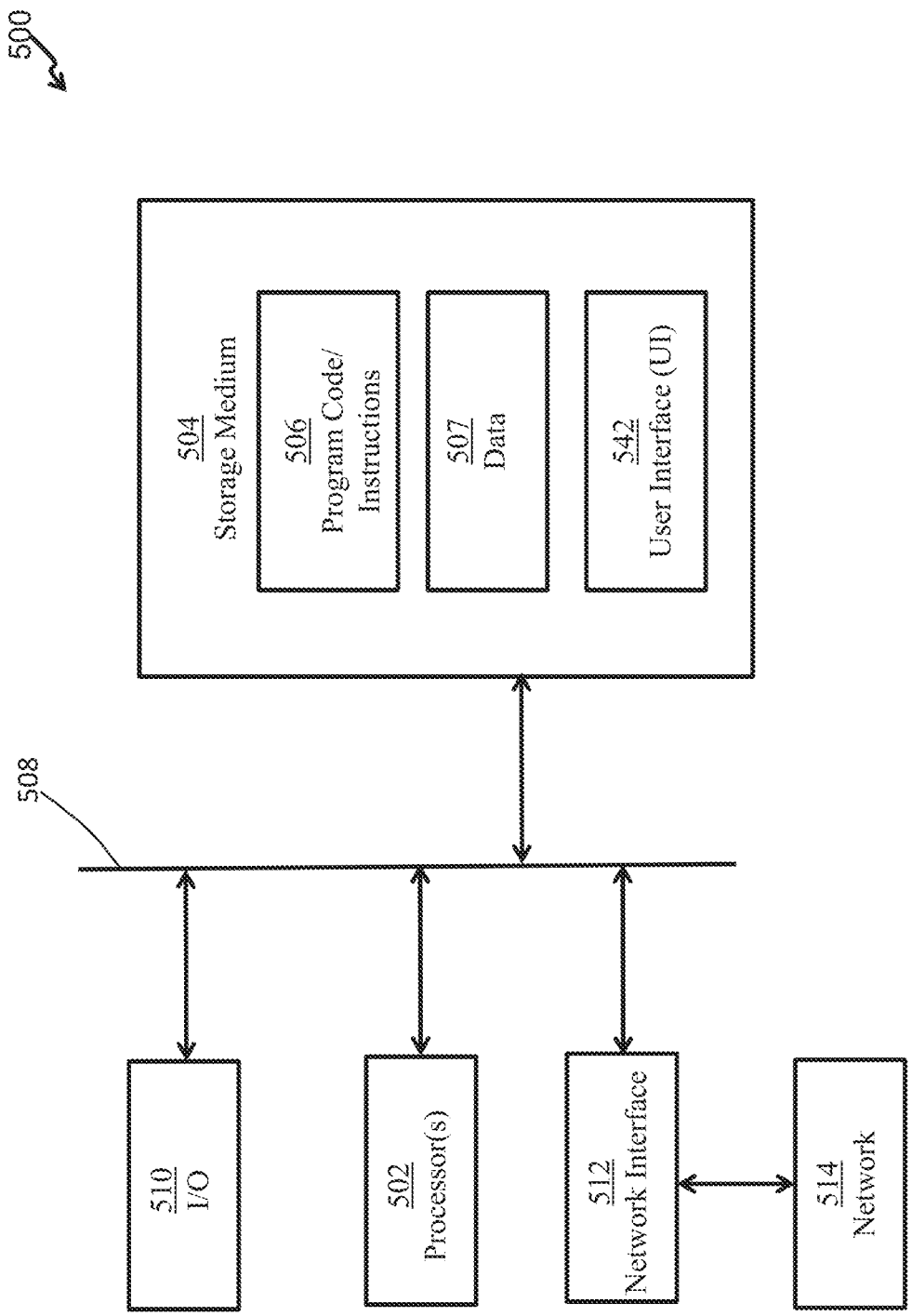
FIG. 5 is a schematic block diagram of a computer system, in accordance with some embodiments.

FIG. 5 is a schematic block diagram of a computer system 500, in accordance with some embodiments. Examples of the computer system 500 include, but are not limited to, desktop, a laptop, a tablet, a smart phone, a server, or the like.

The computer system 500 includes a hardware processor 502 and a non-transitory, computer-readable storage medium 504. Storage medium 504, amongst other things, is encoded with, i.e., stores, computer program code 506, i.e., a set of executable instructions, such as one or more algorithms, programs, applications, sets of executable instructions for a system, component, and/or module, as described with respect to one or more of FIGS. 1A-4. Execution of instructions 506 by hardware processor 502 implements a portion or all of the methods described herein in accordance with one or more embodiments (hereinafter, the noted processes and/or methods).

Processor 502 is coupled to non-transitory computer-readable storage medium 504 via a bus 508. Processor 502 is also coupled to an I/O interface 510 by bus 508. A network interface 512 is connected to processor 502 via bus 508. Network interface 512 is connected to a network 514, so that processor 502 and computer-readable storage medium 504 are connectable to external elements or devices via network 514. Processor 502 is configured to execute computer program code 506 encoded in computer-readable storage medium 504 in order to cause computer system 500 to be usable for performing a portion or all of the noted processes and/or methods. In one or more embodiments, processor 502 comprises a central processing unit (CPU), a multi-processor, a distributed processing system, an application specific integrated circuit (ASIC), and/or a suitable hardware processing unit.

In one or more embodiments, computer-readable storage medium 504 comprises an electronic, magnetic, optical, electromagnetic, infrared, and/or a semiconductor system (or apparatus or device). For example, computer-readable storage medium 504 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 504 includes a compact disk-read only memory (CD-ROM), a compact disk-read/write (CD-R/W), and/or a digital video disc (DVD).

In one or more embodiments, storage medium 504 stores computer program code 506 configured to cause computer system 500 to be usable for performing a portion or all of the noted processes and/or methods. In one or more embodiments, storage medium 504 also stores information or data 507, such as event data, consumer data, business data, policies, component configurations or the like, used in a portion or all of the noted processes and/or methods.

I/O interface 510 is coupled to external circuitry. In one or more embodiments, I/O interface 510 includes a keyboard, keypad, mouse, trackball, trackpad, touchscreen, and/or cursor direction keys for communicating information and commands to processor 502. Computer system 500 is configured to receive information through I/O interface 510. The information received through I/O interface 510 includes one or more of instructions, data, policies, configurations and/or other parameters for processing by processor 502. The information is transferred to processor 502 via bus 508. Computer system 500 is configured to receive information related to a user interface through I/O interface 510. The information is stored in computer-readable storage medium 504 as user interface (UI) 542.

Network interface 512 allows computer system 500 to communicate with network 514, to which one or more other computer systems are connected. Network interface 512 includes wireless network interfaces such as BLUETOOTH, WIFI, WIMAX, GPRS, LTE, 5G, 6G, WCDMA, or the like; or wired network interfaces such as ETHERNET, USB, IEEE-864 or the like. In one or more embodiments, a portion or all of noted processes and/or methods, is implemented in two or more computer system 500.

In some embodiments, a portion or all of the noted processes and/or methods is implemented as a standalone software application for execution by one or more hardware processors. In some embodiments, a portion or all of the noted processes and/or methods is implemented as a software application that is a part of an additional software application. In some embodiments, a portion or all of the noted processes and/or methods is implemented as a plug-in to a software application.

In some embodiments, a portion or all of the noted processes and/or methods is realized as functions of a program stored in a non-transitory computer readable recording medium. The non-transitory computer readable recording medium having the program stored therein is a computer program product. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A system for customizable presentation of workflow transition, the system comprising:
   at least one processor; and
   at least one computer readable storage medium coupled to the at least one processor and configured to store executable instructions that, when executed by the at least one processor, cause the at least one processor to implement a user interface layer and generate a graphic user interface (GUI), wherein the at least one processor is further caused to:
      visually present, on the GUI, a first input area for receiving user input of a workflow transition setting for configuring a workflow, wherein the workflow comprises a plurality of elements arranged in a sequence,
      execute the workflow, and
      while executing the workflow, based on the workflow transition setting, visually present, on the GUI, a workflow transition input area for receiving user input of a transition, among the plurality of elements of the workflow, from a current element to a subsequent element in the sequence, wherein, the executable instructions, when executed by the at least one processor, cause the at least one processor to:
         in response to the workflow transition setting having a first value, visually present, on the GUI, the workflow transition input area in a first format, and
         in response to the workflow transition setting having a second value different from the first value, visually present, on the GUI, the workflow transition input area in a second format distinctive from the first format.

2. The system of claim 1, wherein the executable instructions, when executed by the at least one processor, cause the at least one processor to:
   while configuring the workflow, visually present, on the GUI, the first input area as a toggle button having a first state corresponding to the first value, and a second state corresponding to the second value.

3. The system of claim 1, wherein the executable instructions, when executed by the at least one processor, cause the at least one processor to, while executing the workflow:
   in the first format, visually present, on the GUI, the workflow transition input area as a menu comprising one or more selectable menu items each corresponding to one subsequent element following the current element in the workflow, and
   in the second format, visually present, on the GUI, the workflow transition input area as comprising one or more operable action buttons each corresponding to one subsequent element following the current element in the workflow.

4. The system of claim 3, wherein the menu is a drop-down menu, a pop-up menu, or a pull-down menu.

5. The system of claim 3, wherein the executable instructions, when executed by the at least one processor, cause the at least one processor to, while executing the workflow:
   in response to user selection of a menu item among the one or more selectable menu items in the first format,
      automatically advance the workflow by making the subsequent element corresponding to the selected menu item a new current element,
      automatically update a status of the workflow based on the new current element, and
      automatically update the workflow transition input area on the GUI to include a further menu comprising one or more further selectable menu items corresponding to one or more further subsequent elements following the new current element in the workflow.

6. The system of claim 3, wherein the executable instructions, when executed by the at least one processor, cause the at least one processor to, while executing the workflow:
   in response to user operation of an action button among the one or more operable action buttons in the second format,
      automatically advance the workflow by making the subsequent element corresponding to the operated action button a new current element,
      automatically update a status of the workflow based on the new current element, and
      automatically update the workflow transition input area on the GUI to include one or more further operable action buttons corresponding to one or more further subsequent elements following the new current element in the workflow.

7. The system of claim 3, wherein the executable instructions, when executed by the at least one processor, cause the at least one processor to:
   while configuring the workflow,
      visually present, on the GUI, a second input area for receiving user input of a customized workflow status, and
      store the customized workflow status, and
   while executing the workflow, in response to a subsequent element of the current element corresponding to the customized workflow status, visually present, on the GUI, the customized workflow status
      in the first format, as the selectable menu item corresponding to the subsequent element, and
      in the second format, as the operable action button corresponding to the subsequent element.

8. The system of claim 7, wherein the executable instructions, when executed by the at least one processor, cause the at least one processor to:
   while configuring the workflow,
      visually present, on the GUI, a third input area for receiving user input of a customized workflow status category,
      store the customized workflow status category in a list of selectable workflow status categories, and
      visually present, on the GUI and together with the second input area, the list of selectable workflow status categories in a further menu for receiving user selection, from the list, of a workflow status category to which the customized workflow status belongs.

9. The system of claim 1, wherein the executable instructions, when executed by the at least one processor, cause the at least one processor to:

while configuring the workflow, visually present, on the GUI and together with the first input area, at least one second input area for receiving user input of at least one of
- a ticket family to which a ticket corresponding to an instance of the workflow belongs,
- a ticket type of the ticket, or
- a service level agreements (SLA) rule.

10. The system of claim 1, wherein the executable instructions, when executed by the at least one processor, cause the at least one processor to implement an administration module and a digital workflow services module, wherein
the administration module comprises:
   a status category module configured to, based on user input, create one or more customized workflow status categories,
   a workflow status master module configured to, based on user input, create one or more customized workflow statuses each belonging to a workflow status category, and
   a database configured to store workflow data and the workflow transition setting of the workflow, and
the digital workflow services module is configured to provide, for each instance of the workflow, a unique process identification (ID) to the administration module.

11. The system of claim 10, wherein
the digital workflow services module is configured to provide the unique process ID in response to a request from the administration module through an application programming interface (API) call.

12. The system of claim 10, wherein
the digital workflow services module is configured to:
   interface with a workflow builder, and
   forward the unique process ID generated by the workflow builder to the administration module.

13. The system of claim 10, wherein
the administration module further comprises an administrator data access object (DAO) module configured to:
   store the workflow transition setting in the database, and
   execute a query on service logic to store the workflow data of the workflow in the database.

14. The system of claim 13, wherein
the administration module further comprises an administrator service module configured to:
   store the process ID in association with a ticket family to which a ticket corresponding to the instance of the workflow belongs, and
   create the query on service logic for execution by the administrator DAO module.

15. A method of customizable presentation of workflow transition, said method performed at least in part by at least one processor, said method comprising:
   implementing a user interface layer and generating a graphic user interface (GUI);
   providing a unique process identification (ID) for each instance of a workflow;
   storing a workflow transition setting of the workflow in a database;
   storing the process ID in association with a ticket family to which a ticket corresponding to the instance of the workflow belongs;
   executing a query on service logic to store workflow data of the workflow in the database;
   executing the workflow; and
   while executing the workflow, in response to different values of the workflow transition setting, visually presenting on the GUI, correspondingly in different formats, a workflow transition input area for receiving user input of a transition, among a plurality of elements arranged in a sequence in the workflow, from a current element to a subsequent element in the sequence.

16. The method of claim 15, further comprising:
while executing the workflow, in the workflow transition input area on the GUI, visually presenting at least one user-customized workflow status corresponding to at least one subsequent element following the current element in the workflow.

17. The method of claim 15, further comprising:
generating a human-readable ticket ID for the ticket based on a predetermined naming convention, the ticket ID associated with the process ID which is randomly generated; and
visually presenting the ticket ID, the ticket family, and a current status of the workflow together on a screen of the GUI.

18. The method of claim 15, wherein
while executing the workflow,
   in response to a first value of the workflow transition setting, the workflow transition input area is visually presented, on the GUI, as a drop-down menu comprising one or more selectable menu items each corresponding to one subsequent element following the current element in the workflow, and
   in response to a second value of the workflow transition setting, the workflow transition input area is visually presented, on the GUI, as comprising one or more operable action buttons each corresponding to one subsequent element following the current element in the workflow.

19. The method of claim 15, further comprising:
while executing the workflow, in response to user input in the workflow transition input area to transit from the current element to a subsequent element in the sequence,
   making the subsequent element a new current element,
   update a status of the workflow based on the new current element, and
   update the workflow transition input area based on one or more further subsequent elements following the new current element in the workflow.

20. A computer program product, comprising a non-transitory, tangible computer readable storage medium storing a computer program that, when executed by at least one processor, causes the at least one processor to:
   implement a user interface layer and generate a graphic user interface (GUI);
   receive, through the GUI, at least one user-customized workflow status for a workflow,
   receive, through the GUI, a workflow transition setting for the workflow,
   execute the workflow, and
   while executing the workflow, based on the workflow transition setting and using the at least one user-customized workflow status, visually present, on the GUI, one or more subsequent elements following a current element among a plurality of elements arranged in a sequence in the workflow, wherein
      in response to a first value of the workflow transition setting, the at least one processor is caused to visually present, on the GUI, the one or more subsequent elements as corresponding one or more selectable menu items in a drop-down menu, and in response to a second value of the workflow transition setting, the at least one processor is caused to visually present, on the GUI, the one or more subsequent elements as corresponding one or more operable action buttons.

\* \* \* \* \*